United States Patent
Strater et al.

(10) Patent No.: US 12,302,107 B2
(45) Date of Patent: May 13, 2025

(54) FUNCTIONALITY TO IMPROVE EXTENDER ONBOARDING PRIOR TO COUNTRY CODE DETERMINATION

(71) Applicant: ARRIS Enterprises LLC, Suwanee, GA (US)

(72) Inventors: Jay W. Strater, San Diego, CA (US); Kurt Alan Lumbatis, Dacula, GA (US); Gregory N. Nakanishi, San Diego, CA (US)

(73) Assignee: ARRIS ENTERPRISES LLC, Horsham, PA (US)

( * ) Notice: Subject to any disclaimer, the term of this patent is extended or adjusted under 35 U.S.C. 154(b) by 327 days.

(21) Appl. No.: 18/094,570

(22) Filed: Jan. 9, 2023

(65) Prior Publication Data

US 2023/0224711 A1    Jul. 13, 2023

Related U.S. Application Data

(60) Provisional application No. 63/301,566, filed on Jan. 21, 2022, provisional application No. 63/299,149, filed on Jan. 13, 2022.

(51) Int. Cl.
*H04W 12/50* (2021.01)
*H04W 12/06* (2021.01)
(Continued)

(52) U.S. Cl.
CPC ........... *H04W 12/50* (2021.01); *H04W 12/06* (2013.01); *H04W 12/61* (2021.01); *H04W 52/34* (2013.01); *H04W 76/14* (2018.02)

(58) Field of Classification Search
CPC ..... H04W 12/50; H04W 52/34; H04W 76/14; H04W 84/12; H04W 52/367; H04W 52/42; H04W 24/02; H04W 8/005; H04W 76/10
See application file for complete search history.

(56) References Cited

U.S. PATENT DOCUMENTS 10,477,597 B2    11/2019    Kawasaki
2019/0373464 A1*  12/2019    Chari .................... H04L 63/083
(Continued)

FOREIGN PATENT DOCUMENTS

WO    2020/132448    6/2020

OTHER PUBLICATIONS

International Preliminary Report on Patentability dated Jun. 20, 2024 in International (PCT) Application No. PCT/US2023/010406.
(Continued)

*Primary Examiner* — Huan V Doan
(74) *Attorney, Agent, or Firm* — Wenderoth, Lind & Ponack, L.L.P.

(57) ABSTRACT

A client device for use with a wireless network controller device, a connected wireless APD and a second wireless APD, the client device including: a memory; and a processor configured to execute instructions stored on the memory to cause the client device to: associate with the wireless network; and transmit an onboard new APD instruction to the wireless network controller device to cause the wireless network controller device to: transmit a restricted mode instruction to instruct the connected wireless APD and to instruct the connected wireless APD to transmit a beacon; receive a notification of the probe request; transmit the onboarding instruction to instruct the connected wireless APD; and transmit the primary mode instruction to instruct the connected wireless APD, wherein the onboarding instruction causes one of: the connected wireless APD to transmit the beacon; and the connected wireless APD to not transmit the beacon only on the assigned channel.

15 Claims, 12 Drawing Sheets

(51) Int. Cl.
*H04W 12/61* (2021.01)
*H04W 52/34* (2009.01)
*H04W 76/14* (2018.01)

(56) References Cited

U.S. PATENT DOCUMENTS

2020/0169894 A1* 5/2020 Dillon .................. H04W 16/18
2021/0203524 A1 7/2021 Strater et al.
2021/0203527 A1 7/2021 Strater et al.

OTHER PUBLICATIONS

International Preliminary Report on Patentability dated Jun. 20, 2024 in International (PCT) Application No. PCT/US2023/010199.
International Search Report and Written Opinion of the International Searching Authority issued May 8, 2023 in International (PCT) Application No. PCT/US2023/010406.
Kannan, Nav et al., "How to Finally Conquer Wi-Fi in the Home: Service Provider Style", A Technical Paper prepare for SCTE@BULLETISBE by Table of Contents, Jan. 2018, 46 pages.
International Search Report and Written Opinion of the International Searching Authority issued Apr. 13, 2023 in International (PCT) Application No. PCT/US2023/010199.
Anonymous 3, "Wi-Fi Certified Passpoint—Deployment Guidelines", Versions 1.3.3, Nov. 2020, XP055845884, 67 pages.

* cited by examiner

| Country Code | Country/ Region | 2.4 GHz | | 5 GHz UNII-1 | 5 GHz UNII-2 | 5 GHz UNII-2 EXT | 5 GHz UNII-2 EXT | 5 GHz UNII-2 EXT | UNII-3 EXT |
|---|---|---|---|---|---|---|---|---|---|
| | | Ch 1-11 | Ch 12-13 | Ch 36-48 | Ch 52-64 | Ch 100-116 | Ch 120-140 | Ch 144 | Ch 149-165 |
| XA | Extended Americas | 100 mW EIRP | | 50 mW | 250 mW | 250 mW | 250 mW | 250 mW | 500 mW |
| ••• | ••• | ••• | | ••• | ••• | ••• | ••• | ••• | ••• |
| ••• | ••• | ••• | | ••• | ••• | ••• | ••• | ••• | ••• |
| ••• | ••• | ••• | | ••• | ••• | ••• | ••• | ••• | ••• |
| CA | Canada | 1000 mW | | 250 mW | 250 mW | 250 mW | 250 mW | 1000 mW | 1000 mW |

FIG. 2

FUNCTIONALITY TO IMPROVE EXTENDER ONBOARDING PRIOR TO COUNTRY CODE DETERMINATION

BACKGROUND

Embodiments of the invention relate to onboarding an extender to a gateway device.

SUMMARY

Aspects of the present invention are drawn to a client device for use with a wireless network controller device, a connected wireless access point device being connected to a wireless network and a second wireless access point device, the connected wireless access point device being configured to wirelessly communicate on any one of a first plurality of channels within a first frequency set and to wirelessly communicate on any one of a second plurality of channels within a second frequency set, the first frequency set having a first maximum-allowed transmission power, the second frequency set having a second maximum-allowed transmission power, the second maximum-allowed transmission power being greater than the first maximum-allowed transmission power, the connected wireless access point device being configured to operate in a primary mode of operation and a restricted mode of operation, the wireless network controller device being configured to transmit a primary mode instruction to instruct the connected wireless access point device to operate in the primary mode of operation, to transmit a restricted mode instruction to instruct the connected wireless access point device to operate in the restricted mode of operation, and to transmit an onboarding instruction to instruct the connected wireless access point device to initiate onboarding of the second wireless access point device, the second wireless access point device being configured to transmit a probe request to join the wireless network, the connected wireless access point device being configured to transmit a beacon on an assigned channel of one of the second plurality of channels when operating in the restricted mode of operation, the client device including: a memory having instructions stored therein; and a processor configured to execute the instructions stored on the memory to cause the client device to: associate with the wireless network; and transmit an onboard new access point device (APD) instruction to the wireless network controller device to cause the wireless network controller device to: transmit the restricted mode instruction to instruct the connected wireless access point device to operate in the restricted mode of operation and to instruct the connected wireless access point device to transmit the beacon on the assigned channel; receive a notification of the probe request; transmit the onboarding instruction to instruct the connected wireless access point device to initiate onboarding of the second wireless access point device in response to the notification; and transmit the primary mode instruction to instruct the connected wireless access point device to operate in the primary mode of operation, wherein the onboarding instruction causes at least one of the following: the connected wireless access point device to transmit the beacon on the assigned channel; and the connected wireless access point device to not transmit the beacon on any channel other than the assigned channel.

In some embodiments, the client device, for use with the connected wireless access point device being additionally configured to wirelessly communicate on any one of a third plurality of channels within a third frequency set, the third frequency set having a third maximum-allowed transmission power, the third maximum-allowed transmission power being greater than the first maximum-allowed transmission power, the connected wireless access point device being still additionally configured to transmit the beacon on the assigned channel of one of the second plurality of channels or the third plurality of channels, wherein the onboarding instruction causes the connected wireless access point device to transmit the beacon on the assigned channel as one of the second plurality of channels or the third plurality of channels.

In some embodiments, the client device, for additional use with a second connected wireless access point device being connected to a wireless network, the second connected wireless access point device being configured to wirelessly communicate on any one of the first plurality of channels within the first frequency set and to wirelessly communicate on any one of the second plurality of channels within the second frequency set, wherein the onboarding instruction causes at least one of the following: only the connected wireless access point device to transmit the beacon on the assigned channel as an onboarding beacon; and the second connected wireless access point device not to transmit the onboarding beacon on the assigned channel.

In some of these embodiments, the client device, for use with the connected wireless access point device supporting a Wi-Fi protected setup (WPS) to support onboarding and for use with the second wireless access point device having a WPS push button to support onboarding, and wherein the processor is configured to execute instructions stored on the memory to cause the client device to further: transmit the onboarding instruction to cause the connected wireless access point device to initiate onboarding of the second wireless access point device by implementing the WPS without having a WPS push button to have been pushed on the connected wireless access point device.

In some embodiments, the client device, wherein the processor is configured to execute instructions stored on the memory to cause the wireless network controller device to further: start a timer based on the notification of the probe request; and transmit a network reset instruction the earlier of when the second wireless access point device connects to the wireless network prior to expiration of the timer or upon expiration of the timer.

Aspects of the present disclosure are also drawn to a method of operating a client device with a wireless network controller device, a connected wireless access point device being connected to a wireless network and a second wireless access point device, the connected wireless access point device being configured to wirelessly communicate on any one of a first plurality of channels within a first frequency set and to wirelessly communicate on any one of a second plurality of channels within a second frequency set, the first frequency set having a first maximum-allowed transmission power, the second frequency set having a second maximum-allowed transmission power, the second maximum-allowed transmission power being greater than the first maximum-allowed transmission power, the connected wireless access point device being configured to operate in a primary mode of operation and a restricted mode of operation, the wireless network controller device being configured to transmit a primary mode instruction to instruct the connected wireless access point device to operate in the primary mode of operation, to transmit a restricted mode instruction to instruct the connected wireless access point device to operate in the restricted mode of operation, and to transmit an onboarding instruction to instruct the connected wireless access point device to initiate onboarding of the second wireless access point device, the second wireless access point device being configured to transmit a probe request to join the wireless network, the connected wireless access point device being configured to transmit a beacon on an assigned channel of one of the second plurality of channels when operating in the restricted mode of operation, the method including: associating, via a processor configured to execute instructions stored on a memory, with the wireless network; and transmitting, via the processor, onboard new APD instruction to the wireless network controller device to cause the wireless network controller device to: transmit the restricted mode instruction to instruct the connected wireless access point device to operate in the restricted mode of operation and to instruct the connected wireless access point device to transmit the beacon on the assigned channel; receive a notification of the probe request; transmit the onboarding instruction to instruct the connected wireless access point device to initiate onboarding of the second wireless access point device in response to the notification; and transmit the primary mode instruction to instruct the connected wireless access point device to operate in the primary mode of operation, wherein the onboarding instruction causes at least one of the following: the connected wireless access point device to transmit the beacon on the assigned channel; and the connected wireless access point device to not transmit the beacon on any channel other than the assigned channel.

In some embodiments, the method, for additional use with the connected wireless access point device being additionally configured to wirelessly communicate on any one of a third plurality of channels within a third frequency set, the third frequency set having a third maximum-allowed transmission power, the third maximum-allowed transmission power being greater than the first maximum-allowed transmission power, the connected wireless access point device being still additionally configured to transmit the beacon on the assigned channel of one of the second plurality of channels or the third plurality of channels, wherein the onboarding instruction causes the connected wireless access point device to transmit the beacon on the assigned channel as one of the second plurality of channels and the third plurality of channels.

In some embodiments, the method, for additional use with a second connected wireless access point device being connected to a wireless network, the second connected wireless access point device being configured to wirelessly communicate on any one of the first plurality of channels within the first frequency set and to wirelessly communicate on any one of the second plurality of channels within the second frequency set, wherein the onboarding instruction causes at least one of the following: only the connected wireless access point device to transmit the beacon on the assigned channel as an onboarding beacon; and the second connected wireless access point device not to transmit the onboarding beacon on the assigned channel.

In some of these embodiments, the method, for use with the connected wireless access point device supporting a Wi-Fi protected setup (WPS) to support onboarding and for use with the second wireless access point device having a WPS push button to support onboarding, the method further including: transmitting, via the processor, the onboarding instruction to cause the connected wireless access point device to initiate onboarding of the second wireless access point device by implementing the WPS without having a WPS push button to have been pushed on the connected wireless access point device.

In some embodiments, the method, further including: starting, via the processor, a timer based on the notification of the probe request; and transmitting, via the processor, a network reset instruction the earlier of when the second wireless access point device connects to the wireless network prior to expiration of the timer or upon expiration of the timer.

Other aspects of the present disclosure are drawn to a non-transitory, computer-readable media having computer-readable instructions stored thereon, the computer-readable instructions being capable of being read by a client device for use with a wireless network controller device, a connected wireless access point device being connected to a wireless network and a second wireless access point device, the connected wireless access point device being configured to wirelessly communicate on any one of a first plurality of channels within a first frequency set and to wirelessly communicate on any one of a second plurality of channels within a second frequency set, the first frequency set having a first maximum-allowed transmission power, the second frequency set having a second maximum-allowed transmission power, the second maximum-allowed transmission power being greater than the first maximum-allowed transmission power, the connected wireless access point device being configured to operate in a primary mode of operation and a restricted mode of operation, the wireless network controller device being configured to transmit a primary mode instruction to instruct the connected wireless access point device to operate in the primary mode of operation, to transmit a restricted mode instruction to instruct the connected wireless access point device to operate in the restricted mode of operation, and to transmit an onboarding instruction to instruct the connected wireless access point device to initiate onboarding of the second wireless access point device, the second wireless access point device being configured to transmit a probe request to join the wireless network, the connected wireless access point device being configured to transmit a beacon on an assigned channel of one of the second plurality of channels when operating in the restricted mode of operation, wherein the computer-readable instructions are capable of instructing the client device to perform the method including: associating, via a processor configured to execute instructions stored on a memory, with the wireless network; and transmitting, via the processor, onboard new APD instruction to the wireless network controller device to cause the wireless network controller device to: transmit the restricted mode instruction to instruct the connected wireless access point device to operate in the restricted mode of operation and to instruct the connected wireless access point device to transmit the beacon on the assigned channel; receive a notification of the probe request; transmit the onboarding instruction to instruct the connected wireless access point device to initiate onboarding of the second wireless access point device in response to the notification; and transmit the primary mode instruction to instruct the connected wireless access point device to operate in the primary mode of operation, wherein the onboarding instruction causes at least one of the following: the connected wireless access point device to transmit the beacon on the assigned channel; and the connected wireless access point device to not transmit the beacon on any channel other than the assigned channel.

In some embodiments, the non-transitory, computer-readable media, for additional use with the connected wireless access point device being additionally configured to wirelessly communicate on any one of a third plurality of channels within a third frequency set, the third frequency set having a third maximum-allowed transmission power, the third maximum-allowed transmission power being greater than the first maximum-allowed transmission power, the connected wireless access point device being still additionally configured to transmit the beacon on the assigned channel of one of the second plurality of channels or the third plurality of channels, and wherein the computer-readable instructions are capable of instructing the client device to perform the method, wherein the onboarding instruction causes the connected wireless access point device to transmit the beacon on the assigned channel as one of the second plurality of channels and the third plurality of channels.

In some embodiments, the non-transitory, computer-readable media, for additional use with a second connected wireless access point device being connected to a wireless network, the second connected wireless access point device being configured to wirelessly communicate on any one of the first plurality of channels within the first frequency set and to wirelessly communicate on any one of the second plurality of channels within the second frequency set, wherein the computer-readable instructions are capable of instructing the client device to perform the method, wherein the onboarding instruction causes at least one of the following: only the connected wireless access point device to transmit the beacon on the assigned channel as an onboarding beacon; and the second connected wireless access point device not to transmit the onboarding beacon on the assigned channel.

In some of these embodiments, the non-transitory, computer-readable media, for use with the connected wireless access point device supporting a Wi-Fi protected setup (WPS) to support onboarding and for use with the second wireless access point device having a WPS push button to support onboarding, and wherein the computer-readable instructions are capable of instructing the client device to perform the method further including: transmitting, via the processor, the onboarding instruction to cause the connected wireless access point device to initiate onboarding of the second wireless access point device by implementing the WPS without having a WPS push button to have been pushed on the connected wireless access point device.

In some embodiments, the non-transitory, computer-readable media, wherein the computer-readable instructions are capable of instructing the client device to perform the method further including: starting, via the processor, a timer based on the notification of the probe request; and transmitting, via the processor, a network reset instruction the earlier of when the second wireless access point device connects to the wireless network prior to expiration of the timer or upon expiration of the timer.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 2 illustrates an example country code chart;

DETAILED DESCRIPTION

The present disclosure generally deals with onboarding a new extender onto an existing wireless network. A prior art method of onboarding a new extender onto an existing wireless network will first be described to outline a problem the present disclosure is addressing. This will be described in greater detail with reference to FIGS. 1A-C.

Figure 1A:
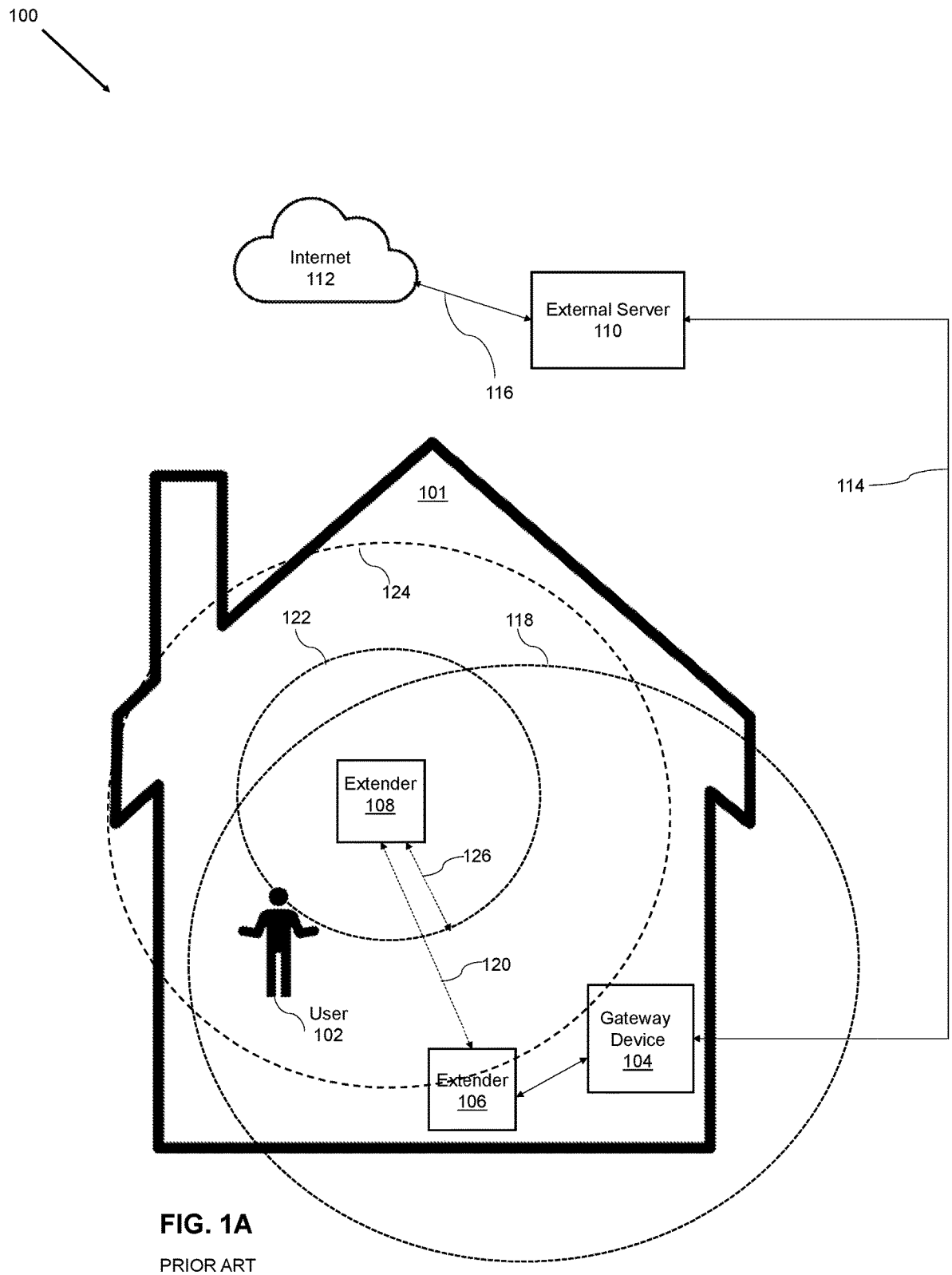
FIG. 1A illustrates a prior art communication system at a time $t_0$.

FIG. 1A illustrates a prior art communication system 100 at a time to.

As shown in FIG. 1A, communication system 100 includes a residence 101, a user 102, a gateway device 104, an extender 106, an extender 108, an external server 110, an Internet 112, communication channels 114 and 116, beacons 120 and 126, and areas 118, 122, and 124.

Gateway device 104 is an electronic device that has a wide area network (WAN) connection and supports a local area network (LAN) at a consumer premises. Gateway device 104 is a device that combines the functions of a modem and a router. A modem is a device that connects to your cable or phone lines and translates the data or information from the Internet to your computer or connected device. A router is a device that works with your modem to create and manage a wireless network so as to wirelessly take the data coming through the modem and sends it wirelessly to multiple devices like smart phones, tablets, gaming consoles, and computers. The consumer premises can include a residential dwelling, an office, or any other business space of a user, such as residence 101. The terms home, office, and premises may be used synonymously herein.

Gateway device 104 may perform such functions as Web acceleration and HTTP compression, flow control, encryption, redundancy switchovers, traffic restriction policy enforcement, data compression, TCP performance enhancements (e.g., TCP performance enhancing proxies, such as TCP spoofing), quality of service functions (e.g., classification, prioritization, differentiation, random early detection (RED) Egress queuing, TCP/UDP flow control), bandwidth usage policing, dynamic load balancing, and routing.

Further, it should be noted that gateway device 104 is able to communicate with external server 110 via communication channel 114, which may optionally be a wireless communication system, such as 4G, or 5G, and further is able to connect to Internet 112 via communication channel 116.

Gateway device 104 serves as a gateway or an access point to Internet 112 for one or more electronic devices.

A wireless access point (WAP), or more generally known as an access point (AP), is a networking hardware device that allows other Wi-Fi devices to connect to a Wi-Fi network. It resides in the gateway and wireless extender devices. A service set ID (SSID) is an identification (in IEEE 802.11) that is broadcast by access points in beacon packets to announce the presence of a wireless network access point for the SSID. SSIDs are customizable IDs that can be zero to 32 bytes, and can be in a natural language, such as English. In residence 101, gateway device 104, extender 106, and extender 108 are access points.

Consider the situation in which user 102 has recently purchased extender 108, and would like to onboard it to their home network. As shown in the figure, when extender 108 is powered up, extender 108 will detect a beacon 120 broadcast from extender 106. Beacon 120 alerts extender 108 to the wireless network of gateway device 104 and extender 106. In this example, extender 106 is broadcasting beacon 120 at a broadcasting power sufficient to transmit beacon 120 throughout an area 118. Because user 102 has initially placed extender 108 at a location within area 118, extender 108 receives beacon 120.

Extender 108, in response to receiving beacon 120, will transmit a probe request to extender 106 in order to initiate onboarding onto the wireless network. In many cases, the manufacturer of extender 108 may manufacture extenders for use throughout a plurality of countries or regions. Further, the country/region of deployment may not be known when an extender is shipped from the manufacturing plant.

When an extender is eventually powered up to initiate onboarding onto a detected wireless network as discussed above, the initial broadcasting power will be limited. In particular, there are Wi-Fi transmission power restrictions based on the region or country of deployment. For purposes of this discussion, consider the situation where extender 108 is manufactured by a manufacturer that supplies such extenders to multiple countries/regions. Accordingly, how much power at which extender 108 may broadcast the probe request as discussed above with reference to FIG. 1A is not a simple question. This will be described in greater detail with reference to FIG. 2.

FIG. 2 illustrates an example country code chart 200.

As shown in FIG. 2, country code chart 200 includes: a plurality rows 202, a sample of which includes a row 204 and a row 206; a country code column 208; a country/region column 210; a plurality of channel columns 212; a blackened area 214; and a plurality of entries, samples of which are indicated as entry 216 and entry 218.

Country code column 208 contains the country codes for countries for which extender 108 may be deployed. Each row in plurality of rows 202 corresponds to a specific country for which extender 108 may be deployed, two examples of which are labeled row 204 and row 206. In this example, row 204 includes a country code "XA," wherein the associated row 206 includes a country code "CA."

Country/region column 210 contains the countries for which extender 108 may be deployed. In this example, row 204 indicates that country code "XA" corresponds to the region Extended Americas, which may include all countries of North, South and Central America. Further, in this example, row 206 indicates that country code "CA" corresponds specifically to Canada.

Plurality of channel columns 212 include columns for groups of available Wi-Fi channels, which include channels 1-11 and channels 12-13 in the 2.4 GHz band, and which also include channels 36-165 in the 5 GHz band as defined by the Unlicensed National Information Infrastructure (U-NII).

Country code chart 200 indicates the maximum allowable power at which a Wi-Fi extender as a backhaul station (bSTA) may initially broadcast a probe request to a network access point in order to onboard onto an existing wireless network. It should be noted that the data in country code chart 200 is merely repetitive and may not include true values for the indicated countries/regions. Further, it should be noted that some channels are unavailable in certain regions/countries, which is represented by blackened area 214 for channels 12-13 in the 2.4 GHz band.

Of more importance, country code chart 200 illustrates the difference in allowed maximum transmission powers between differing countries/regions. For example, for channels 36-48, if extender 108 were to try to onboard onto a wireless network, the maximum initial broadcast power to initiate onboarding, for example when broadcasting a probe request, is only 50 mW if deployed in the Extended Americas as indicated by entry 216 of country code chart 200. This is because the Extended Americas regional power/channel information is reflective of a minimum common denominator for all countries in the region, and is needed by a device prior to learning of its specific country code. However, for channels 36-48, if extender 108 were to try to onboard onto a wireless network, the maximum initial broadcast power to initiate onboarding is 250 mW if deployed in the Canada with knowledge of the Canadian country code as indicated by entry 218 of country code chart 200.

Country code chart 200 is stored within a memory of extender 108. In order to determine the maximum allowable transmission power to use when initiating onboarding onto a new wireless network, extender 108 will reference country code chart 200 when it learns the country code of the wireless network. Unfortunately, extender 108 can only learn the country code, either from extender 106 or gateway device 104, after extender 108 has joined the wireless network. Alternatively, in some instances, extender 108 may learn the country code by contacting external server 110 via extender 106 and gateway device 104, after extender 108 has joined the wireless network. Therefore, the problem with the prior art method of onboarding an extender is that the extender cannot determine the actual maximum allowable transmission power after initiating the onboarding process.

As shown in FIG. 2, for channel 53, there may be multiple different maximum allowable transmission powers for initiating onboarding onto a new wireless network. For purposes of discussion, let residence 101 be located the extended Americas region and let extender 108 detect the beacon on channel 36. Further, for purposes of discussion, of all the countries/regions in country code chart 200, Canada as shown in row 206 has the lowest maximum allowable transmission powers for initiating onboarding onto a new wireless network, at 250 mW. Here, because extender 108 does not know what country in which extender 108 is being deployed, it cannot determine the maximum allowable transmission powers for initiating onboarding onto a new wireless network. Therefore, to assure that extender 108 does not broadcast at a power that is higher than the maximum allowable transmission power for initiating onboarding onto an existing wireless network in its current region, extender 108 will, by default, broadcast at the lowest maximum allowable transmission power for initiating onboarding onto a new wireless network for all countries/regions listed in country code chart 200. In this example, extender 108 will, by default, broadcast at 50 mW as indicated by the maximum allowable transmission power allowed for its Extended Americas region, even though it may be located in Canada for which it is allowed to transmit at a higher power level.

Returning to FIG. 1A, area 122 represents the area for which extender 108 can broadcast at 50 mW, whereas area 124 represents the area for which extender 108 can broadcast at 250 mW. As discussed above, because extender 108 does not know the country/region in which it is operating at time to, is will by default broadcast at 50 mW. As shown in the figure, extender 108 therefore broadcasts a probe request 126, which only travels as far as area 122. As a result, extender 106 does not receive probe request 126 and the onboarding of extender 108 is not initiated.

Eventually, user 102 will realize that the onboarding process is not working. To alleviate the problem, user 102 will have to pick up extender 108 and move it closer to extender 106. This will be described in greater detail with reference to FIG. 1B.

Figure 1B:
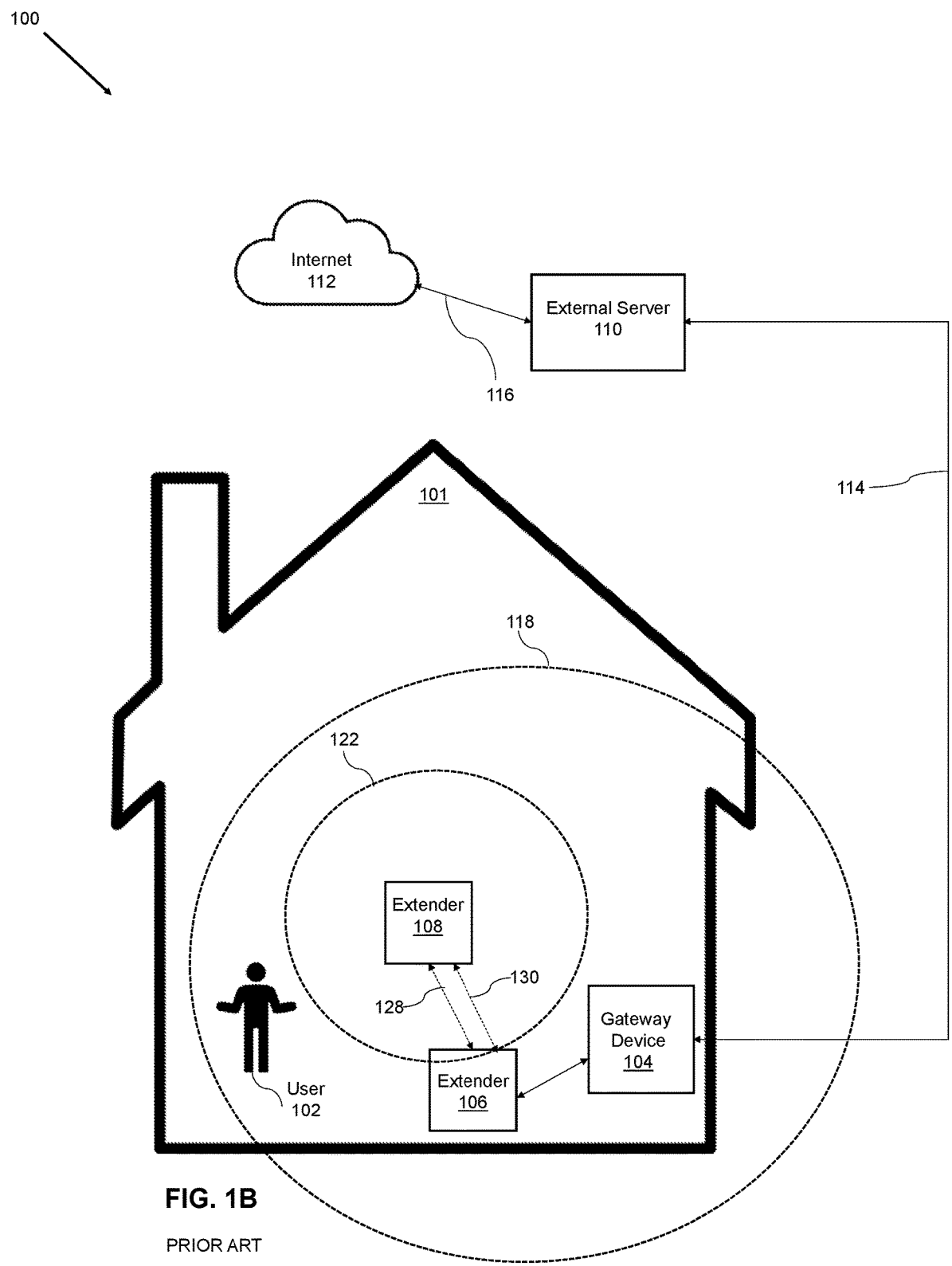
FIG. 1B illustrates prior art communication system at a time $t_1$.

FIG. 1B illustrates prior art communication system 100 at a time $t_1$.

As shown in the figure, extender 108 is now located sufficiently close to extender 106 such that extender 106 is within broadcast area 122, when extender 108 is broadcasting at 50 mW. In this case, when extender 106 broadcasts a new beacon 128, beacon 128 will be received by extender 108. Extender 108 then transmits a new probe request 130, which is, this time, received by extender 106. At this point, the onboarding process is initiated. Once onboarded, extender 108 may obtain the country code, either from one of extender 106 or gateway device 104, or from external server 110. In any event, with the country code known, extender 108 will be able to look up the appropriate maximum transmission power for initiating onboarding, in a future event that extender 108 disassociates from the wireless network. At this point, user 102 can move extender 108 back to the original position. This will be described in greater detail with reference to FIG. 1C.

Figure 1C:
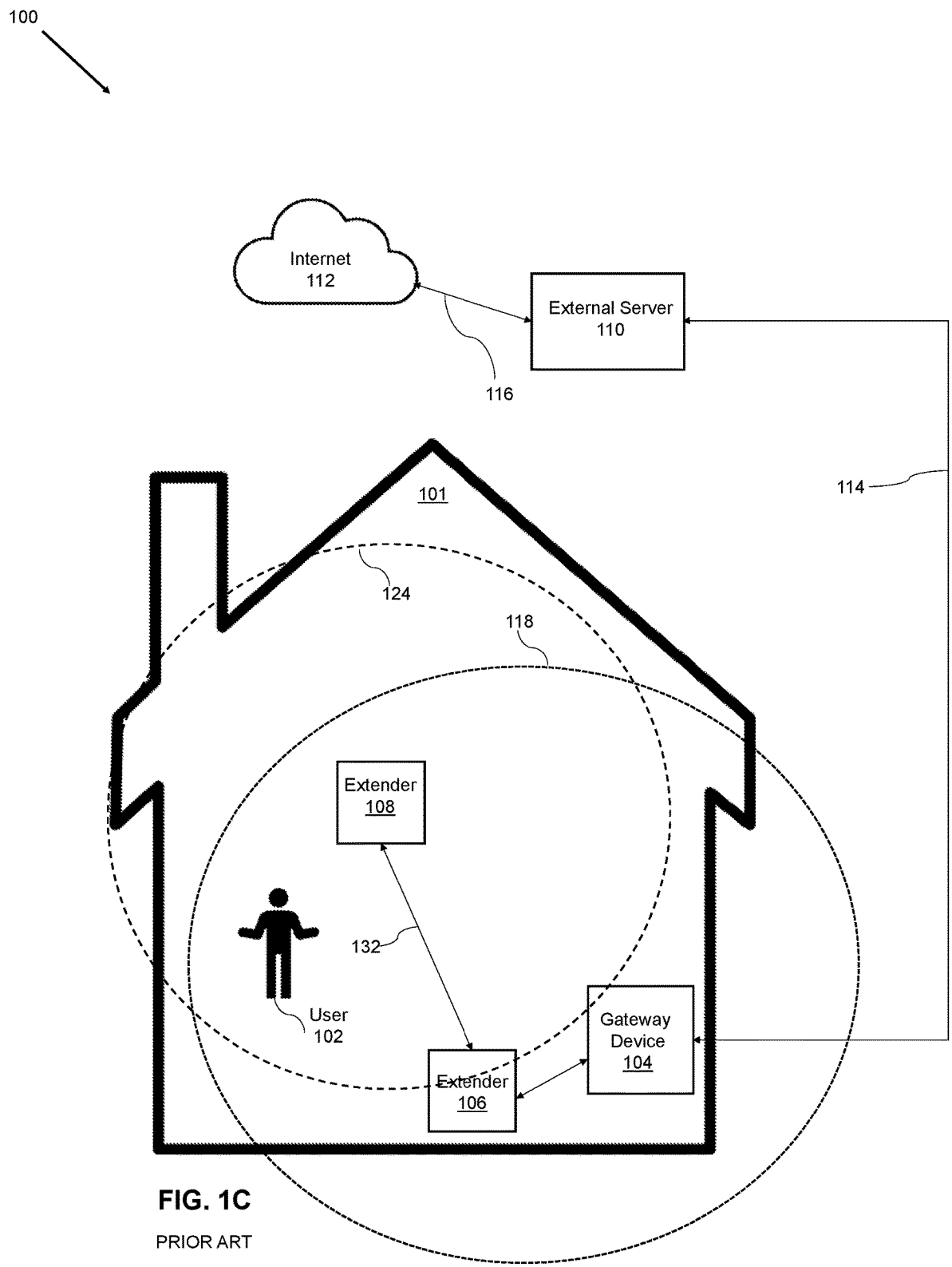
FIG. 1C illustrates prior art communication system at a time $t_2$.

FIG. 1C illustrates prior art communication system 100 at a time $t_2$.

As shown in the figure, user 102 has move extender 108 back to the original position as discussed above with reference to FIG. 1A. When the user 102 unplugs extender 108 to move extender 108 back to the original position, extender 108 disassociates from the wireless network. When user 102 repowers extender 108 at the original position, extender 108 will need to connect to the network. However, in this instance, extender 108 already knows the country code for which it is operating. Therefore, extender 108 is able to transmit a probe request at 250 mW, which will be received by extender 106. Following a probe response from extender 106, extender 108 will be able to associate with extender 106 to establish a backhaul communication link with extender 108 to become connected to the wireless network as indicated by wireless communication channel 132.

As discussed above, many gateways and wireless extenders throughout many areas of the world are not provisioned with their country code. Instead, the devices learn of their country code after they have established an IP connection with the network. Prior to learning of their country code, the devices which use Wi-Fi radios as their network backhaul can only operate at restricted Wi-Fi power levels based on their region of deployment. The restricted power levels must be restricted to the least amount of power within the minimum common channel set allowed for any of the countries for its region of deployment.

Due to Wi-Fi power level restrictions based on region, user 102 should place extender 108 sufficiently close to extender 106 in order to extender 108 to transmit at the lowest transmission power limit in order to onboard onto the wireless network. If user 102 were to move extender 108 further away from extender 106, the onboarding process would not be initiated. Extender 108 cannot transmit at a power level that is higher than a universal minimum transmission power level of the available maximum power levels in order to be used in a plurality of regions or countries. In many cases, this universal minimum transmission power level of the available maximum power levels will likely be lower than an available maximum lower level.

This is not an issue for a gateway with direct WAN connection to the network. However, it is an issue for extenders which need to be connected (or onboarded) onto the wireless LAN (WLAN) to receive wireless backhaul credentials. Particularly for a user self-install of a wireless extender, a user wants to position their new extender at a recommended distance from an existing WLAN device (access point device) and have it successfully onboarded from there.

However, if the new wireless extender does not have its country code and must operate at restricted regional Wi-Fi power levels until getting its country code, the extender may not be successfully onboarded at the desired distance. Instead, a user may have to move their extender much closer to another WLAN device to have the extender successfully onboard the network, then move it back to the desired location. This can prove to be frustrating for the use. It may also result in a care call to an operator if the on-boarding fails.

What is needed is a system and method for efficiently onboarding an extender to a network.

A system and method in accordance with the present disclosure efficiently onboards an extender to a network.

In accordance with the present disclosure, when onboarding a new extender, a user, operating a client device, can use the client device to communicate with WLAN access point devices, such as a gateway and extenders. The client device can instruct the gateway and extenders to avoid use of channel(s) that a new extender will have severely restricted transmission power prior to knowing its country code. Without knowledge of its country code, the extender onboarding onto the access point device will be restricted to a regional transmission power limit that is channel specific. All WLAN access points will move any front haul radio channels that they may have had on one channel to another channel with a higher transmission power while the new extender is being onboarded. This would result in the new extender's transmission power limit being increased, thus allowing the extender to onboard more efficiently.

An example system and method for efficiently onboarding an extender to a network in accordance with aspects of the present disclosure will now be described in greater detail with reference to FIGS. 3-7.

Figure 3:
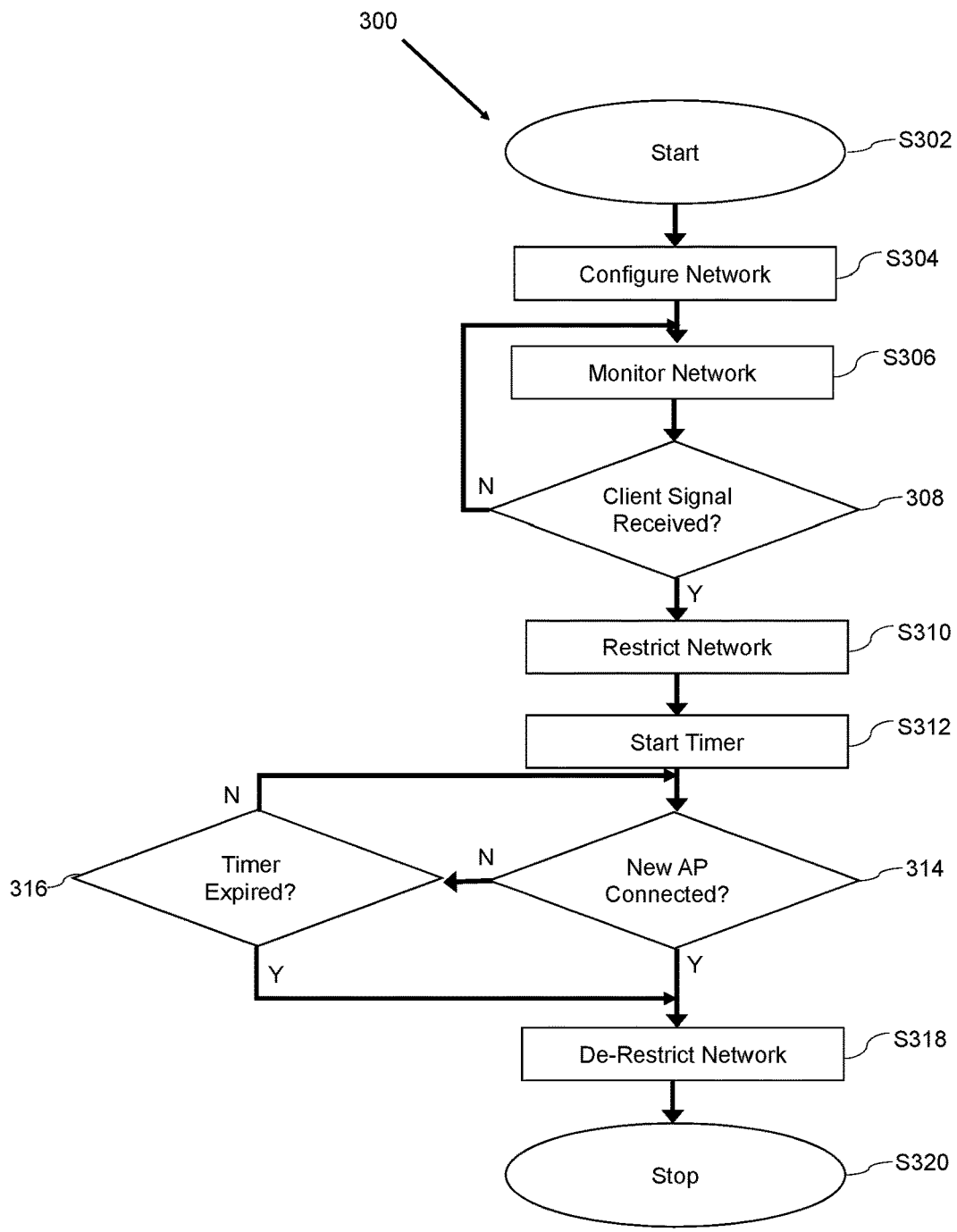
FIG. 3 illustrates a method for onboarding an extender through the use of a client device in accordance with aspects of the present disclosure.

FIG. 3 illustrates a method 300 for onboarding an extender through the use of a client device in accordance with aspects of the present disclosure.

As shown in FIG. 3, method 300 starts (S302), and the network is configured (S304). This will be described in greater detail with reference to FIGS. 4A and 5A.

Figure 4A:
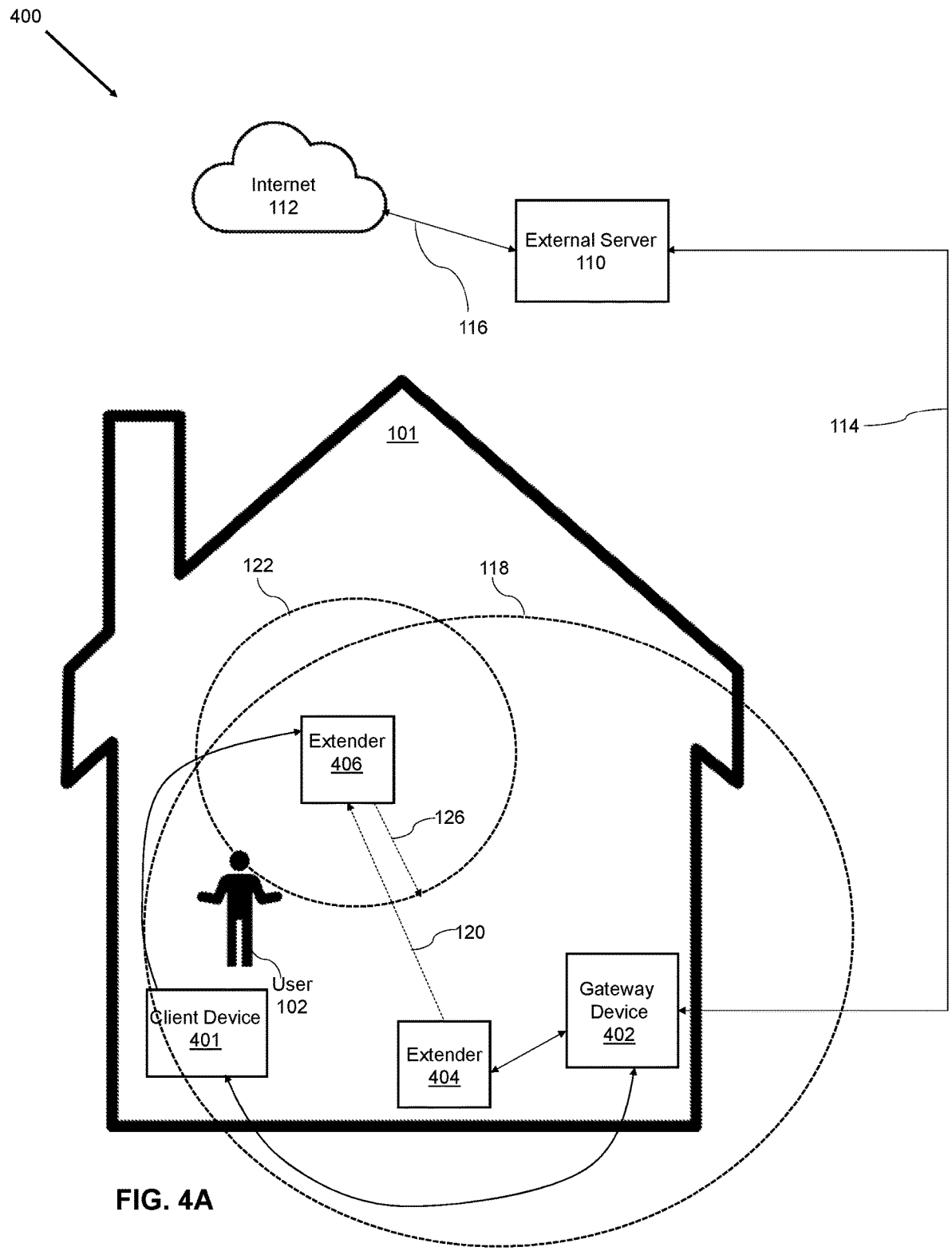
FIG. 4A illustrates a communication system at a time $t_0$ in accordance with aspects of the present disclosure.

FIG. 4A illustrates a communication system 400 at a time $t_0$ in accordance with aspects of the present disclosure.

As shown in FIG. 4A, communication system 400 includes: residence 101; user 102; a client device 401; a gateway device 402; an extender 404; an extender 406; external server 110; Internet 112; and communication channels 114 and 116.

Elements common to communication system 100 and communication system 400 operates in similar manner as discussed above with reference to FIG. 1A. However, communication system 400 introduces client device 401, which will be used to onboard extender 406 to the network of residence 101 in accordance with aspects of the present disclosure. Further, in this example, let extender 404 be currently onboarded onto gateway device 402, such that extender 404 is part of the wireless network. Client device 401 may be any device or system that presents content to, accepts input from, or directly or indirectly interacts with user 102. In this non-limiting example, client device 401 may be smart phones, tablets, personal computers, TV set-top boxes, videogame consoles, smart media devices, home security devices, or Internet-of-Things (IoT) devices.

Gateway device 402 serves as a network controller, an access point, and a gateway. As a network controller, gateway device 402 is able to configure and maintain a wireless network within residence 101. This includes onboarding extenders to extend the reach of the wireless network within residence 101. It should be noted that a network controller may reside in any access point within the wireless network, including onboarded extenders. However, for purposes of discussion, let gateway device 402 include the network controller. As an access point, gateway device 402 may onboard client devices to provide them access to the wireless network. As a gateway, gateway device 402 connects the wireless network within residence 101 to Internet 112, thus allowing all devices within the wireless network to have access to Internet 112.

For example, consider the situation in which user 102 has recently purchased extender 406, and would like to onboard it to their home network. Extender 404 periodically broadcasts beacons, each of which advertises the wireless network. In this example, let the broadcasting power from extender 404 be sufficient to transmit beacons throughout an area 118. As shown in the figure, when extender 406 is powered up, extender 406 will detect a beacon 120 broadcast from extender 404. Beacon 120 alerts extender 406 to the wireless network of gateway device 402 and extender 404. Because user 102 has initially placed extender 108 at a location within area 118, extender 108 receives beacon 120. Extender 406, in response to receiving beacon 120, will transmit probe request 126 to extender 404 in order to initiate onboarding onto the wireless network. However, extender 406 is operating at the minimum broadcasting power due to not knowing the country code of gateway device 402. For purposes of discussion let the broadcasting power from extender 406 only be sufficient to transmit probe request 126 as far as the edge of area 122. In this case, area 122 does not contain extender 404, meaning that extender 404 is unaware of the extender 406 attempting to onboard. As a result, extender 404 does not receive probe request 126 and the onboarding of extender 406 is not initiated.

Think of the situation in this manner, extender 404 shouts at a large volume with its beacon 120, "HEY, HERE'S A WIRELESS NETWORK" (and the shout includes some identifying information about the wireless network), and extender 406 whispers in response with probe request 126 at 50 mW "hey, can I join your network?" Unfortunately, in such a situation, probe request 126 from extender 406 will go unheard.

A system and method in accordance with the present disclosure addresses this issue by restricting the network while onboarding a new extender. This will be best described by initially discussing broadcast power levels and country codes.

Figure 5A:
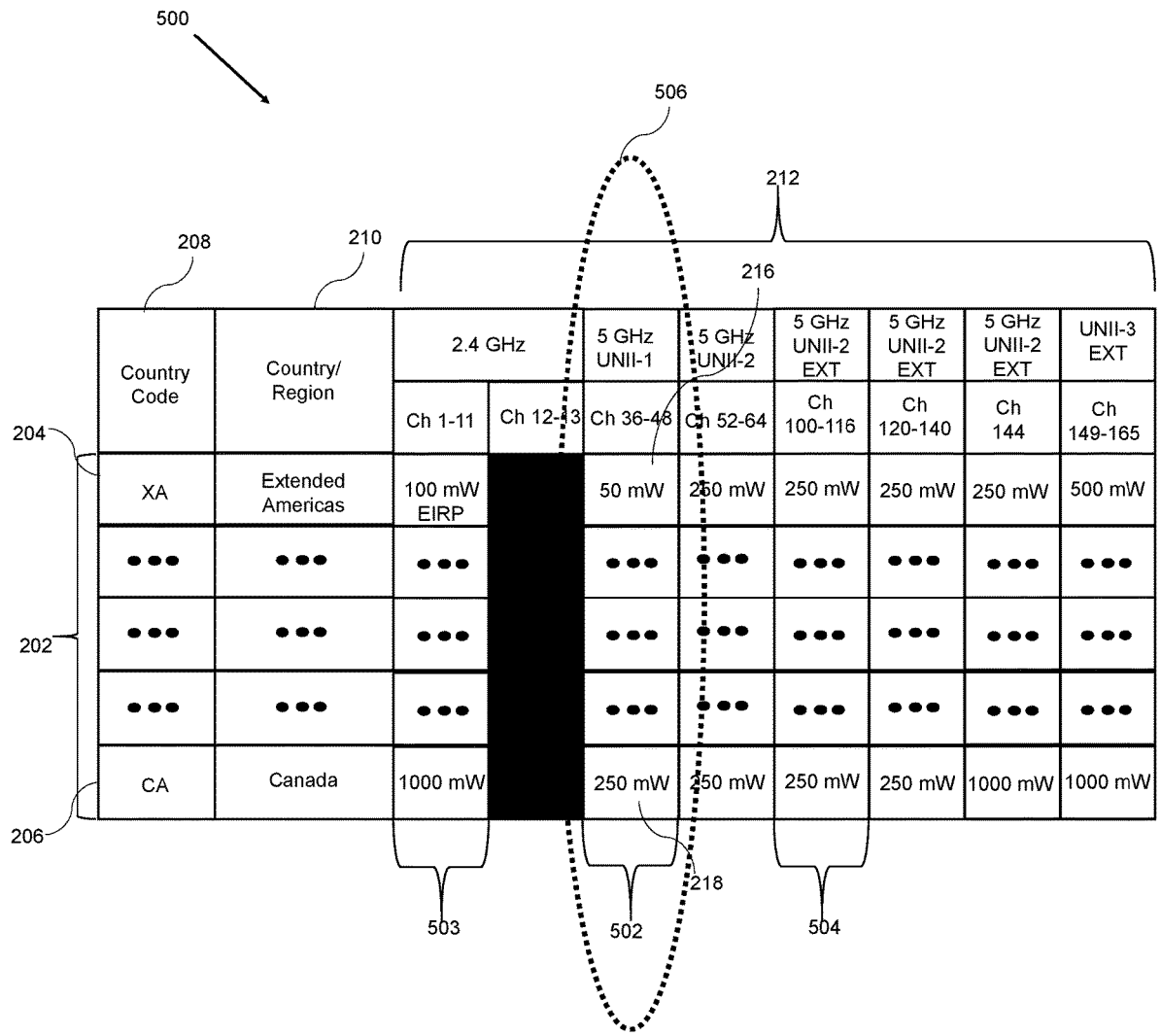
FIG. 5A illustrates an example country code chart at time $t_0$ in accordance with aspects of the present disclosure.

FIG. 5A illustrates an example country code chart 500 at time $t_0$ in accordance with aspects of the present disclosure.

As shown in FIG. 5A, country code chart 500 includes country code chart 200 as discussed with reference to FIG. 2. Country code chart 500 additionally specifically labels channel columns 502, 503, and 504.

Channel column 502 represents 5 GHz UNII-1 channels 36-48. Channel column 504 represents 5 GHz UNII-2 EXT channels 100-116.

A dotted ellipse 506 represents the channel column that includes the current channel on which gateway device 402 and all connected devices are operating. For purposes of discussion, let the current operating channel of gateway device 402 and all connected devices be channel 36.

Country code chart 500 indicates the maximum allowable power at which a Wi-Fi extender may initially broadcast in order to onboard onto an existing wireless network. It should be noted that the data in country code chart 500 is merely repetitive and may not include true values for the indicated countries/regions. Further, it should be noted that some channels are unavailable in certain regions/countries, which is represented by blackened area 214 for channels 12-13 in the 2.4 GHz band.

Of more importance, country code chart 500 illustrates the difference in allowed maximum transmission powers between differing countries/regions. For example, for channels 36-48, if extender 406 were to try to onboard onto a wireless network, the maximum initial broadcast power to initiate onboarding, is only 50 mW if deployed in the Extended Americas as indicated by entry 216. However, for channels 36-48, if extender 406 were to try to onboard onto a wireless network, the maximum initial broadcast power to initiate onboarding is 250 mW if deployed in the Canada with knowledge of the Canadian country code as indicated by entry 218.

Country code chart 500 is stored within a memory of extender 406. In order to determine the maximum allowable transmission power to use when initiating onboarding onto a new wireless network, extender 406 will reference country code chart 500 when it learns the country code of the wireless network. Unfortunately, extender 406 can only learn the country code, either from extender 404 or gateway device 402, after extender 406 has joined the wireless network. Alternatively, in some instances, extender 406 may learn the country code by contacting external server 110 via extender 404 and gateway device 402, after extender 406 has joined the wireless network.

With reference to FIG. 5A, presume that gateway device 402 has now created a network for residence 101. For purposes of the discussion, presume that residence 101 is located within the Extended Americas, shown as row 204. In this example scenario, let gateway device 402 be operating on channel 36 located in channel column 502, indicated by dotted ellipse 506. All connected devices, in this case being client device 401 and extender 404, will also operate on channel 36. Any devices that would like to onboard the network would be required to operate on channel 36. As shown in row 204 and channel column 502, the maximum transmission power for onboarding devices in the Extender Americas is 50 mW.

Configuring the wireless network includes establishing the wireless network via gateway device 402 by any known method. Once established, configuring additionally includes gateway device 402 additionally onboarding wireless client devices and maintaining the wireless network. Further, gateway device 402 may operate the network in any known optimization method, non-limiting examples of which including steering extenders and clients to optimize quality of service, steering extenders and clients to minimize power consumption, etc.

Returning to FIG. 3, after the network is configured (S304), the network is monitored (S306). For example, gateway device 402 will manage all devices currently operating on the network, all of which being client device 401 and extender 404. As stated previously, extender 406 has recently been purchased by user 102, but it has not yet onboarded to the network.

Returning to FIG. 3, after the network is monitored (S306), it is determined if a client signal is received (S308). This will be described in greater detail with reference to FIGS. 4A, 4B and 6.

As shown in FIG. 4A, presume that user 102 would now like to onboard the newly acquired extender 406 to the network of residence 101. User 102 places extender 406 in the location that they would like extender 406 to reside. Extender 404 periodically broadcasts beacons in a manner similar to extender 106 discussed above with reference to FIG. 1A. At time to, extender 404 broadcasts beacon 120 and then extender 406 transmits a probe request 126. In a situation similar to that discussed above with reference to FIG. 1A, as extender 404 is not within area 122, extender 404 will not receive probe request 126.

However, in accordance with aspects of the present disclosure, rather than moving extender 406 closer to extender 404, user 102 will be able to remedy this issue by using client device 401, as will be described with reference to FIGS. 4B and 6.

Figure 4B:
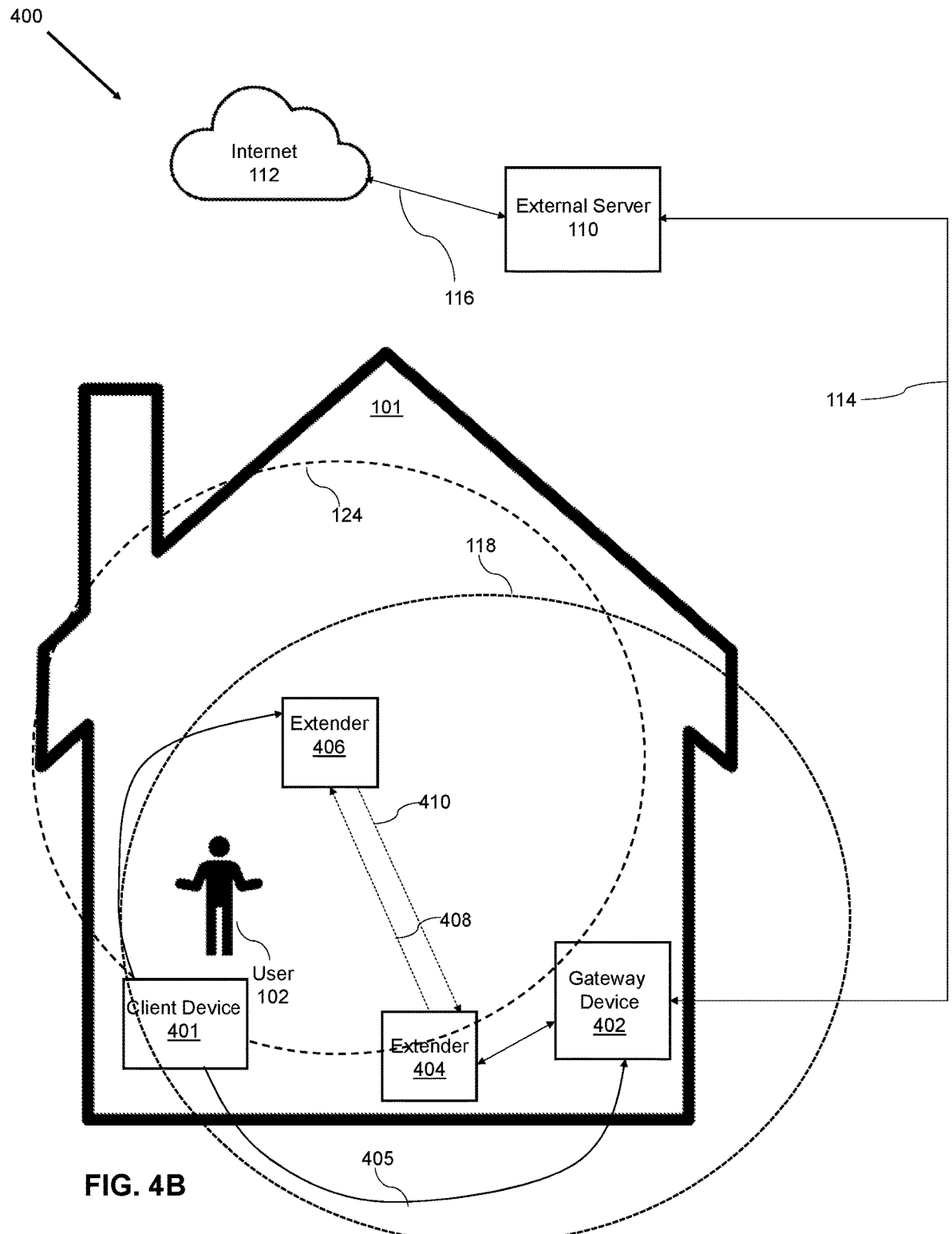
FIG. 4B illustrates a communication system at a time $t_1$ in accordance with aspects of the present disclosure.

FIG. 4B illustrates communication system 400 at a time $t_1$ in accordance with aspects of the present disclosure.

As shown in FIG. 4B, client device 401 transmits a "onboard new APD" instruction 405 to gateway device 402. Onboard new APD instruction 405 will cause gateway device 402 to restrict operation of the network in order onboard a new access point device (APD), which in this case is new extender 406. As such, user 102 will not have to move extender 406 closer to extender 404 in order to onboard extender 406. This will be described in greater detail with reference to FIG. 6.

Figure 6:
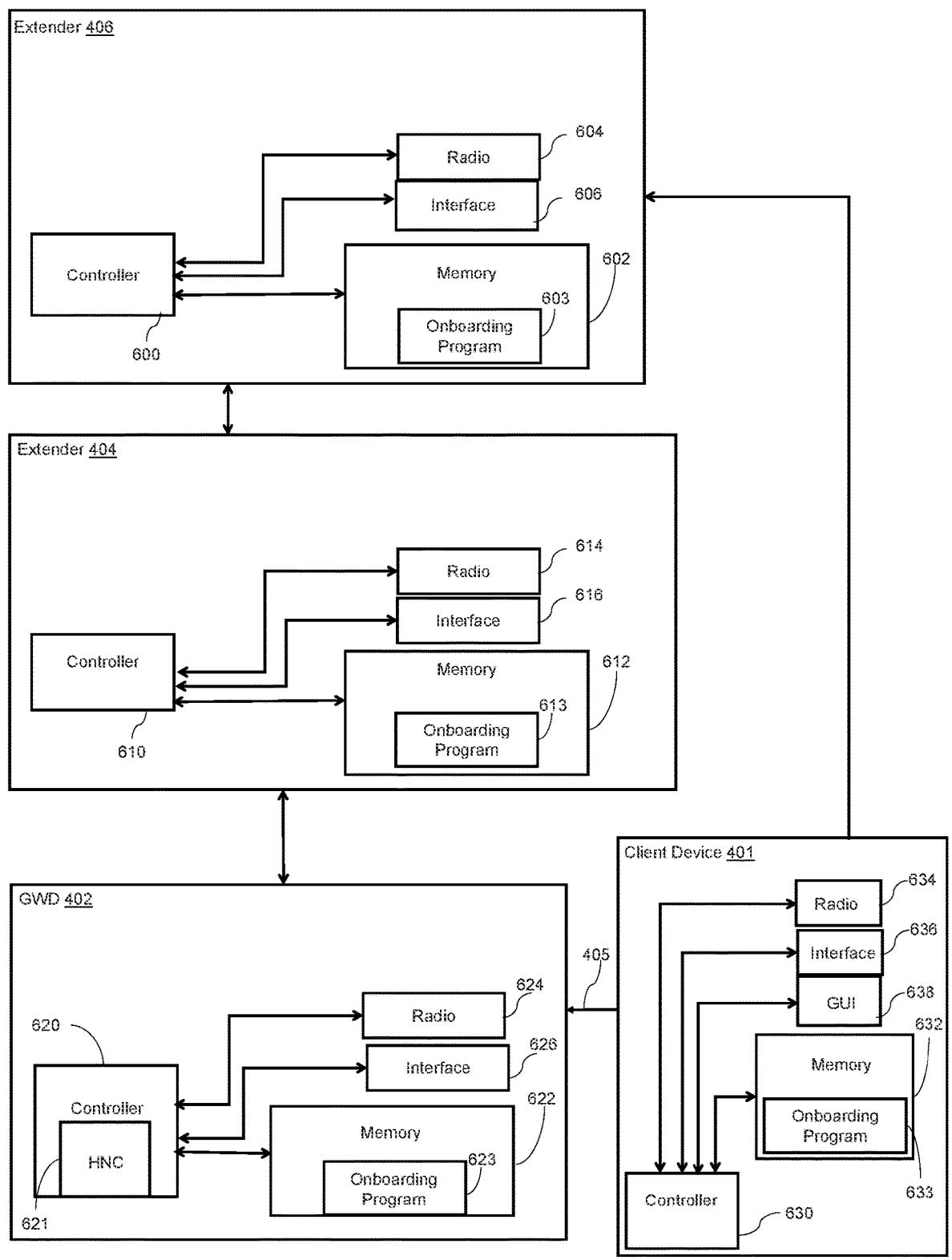
FIG. 6 illustrates an exploded view of two extenders, a gateway device, and a client device in accordance with aspects of the present disclosure.

FIG. 6 illustrates an exploded view of extender 406, extender 404, gateway device 402, and client device 401 in accordance with aspects of the present disclosure.

As shown in FIG. 6, extender 406 includes: a controller 600; a memory 602, which has stored therein an onboarding program 603; at least one radio, a sample of which is illustrated as a radio 604; and an interface 606. Onboarding program 603 include a country code chart, similar to that discussed above with reference to FIG. 5A.

In this example, controller 600, memory 602, radio 604, and interface 606 are illustrated as individual devices. However, in some embodiments, at least two of controller 600, memory 602, radio 604, and interface 606 may be combined as a unitary device. Further, in some embodiments, at least one of controller 600 and memory 602 may be implemented as a computer having tangible computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 600 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of any client devices in the network in accordance with the embodiments described in the present disclosure.

Memory 602 may be any device or system capable of storing data and instructions, including onboarding program 603.

Radio 604 may include a Wi-Fi WLAN interface radio transceiver that is operable to communicate with extender 404 and gateway device 402. Radio 604 includes one or more antennas and communicates wirelessly via one or more of the 2.4 GHz band, the 5 GHz band, the 6 GHz band, and the 60 GHz band, or at the appropriate band and bandwidth to implement any IEEE 802.11 Wi-Fi protocols, such as the Wi-Fi 4, 5, 6, or 6E protocols. Extender 406 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Interface 606 can include one or more connectors, such as RF connectors, or Ethernet connectors, and/or wireless communication circuitry, such as 5G circuitry and one or more antennas.

As shown in FIG. 6, extender 404 includes: a controller 610; a memory 612, which has stored therein an onboarding program 613; at least one radio, a sample of which is illustrated as a radio 614; and an interface 616. Onboarding program 613 includes the country code for which extender 404 is operating such that extender 404 may pass such information on to any other extenders that wish to onboard.

In this example, controller 610, memory 612, radio 614, and interface 616 are illustrated as individual devices. However, in some embodiments, at least two of controller 610, memory 612, radio 614, and interface 616 may be combined as a unitary device. Further, in some embodiments, at least one of controller 610 and memory 612 may be implemented as a computer having tangible computer-readable media for carrying or having computer-executable instructions or data structures stored thereon.

Controller 610 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of extender 404 in accordance with the embodiments described in the present disclosure.

Memory 612, as will be described in greater detail below, has instructions, including onboarding program 613, stored therein to be executed by controller 610 to provide the onboarding communication to extender 406.

Radio 614 may include a Wi-Fi WLAN interface radio transceiver that is operable to communicate with extender 406 and gateway device 402. Radio 614 includes one or more antennas and communicate wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radio 614 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

As shown in FIG. 6, gateway device 402 includes: a controller 620, which has stored therein a home network controller (HNC) 621; a memory 622, which has stored thereon an onboarding program 623; and at least one radio, a sample of which is illustrated as a radio 624; and an interface 626. Onboarding program 623 includes the country code for which gateway device 402 is operating such that gateway device 402 may pass such information on to any other extenders that wish to onboard.

In this example, controller 620, memory 622, radio 624, and interface 626 are illustrated as individual devices. However, in some embodiments, at least two of controller 620, memory 622, radio 624, and interface 626 may be combined as a unitary device. Further, in some embodiments, at least one of controller 620 and memory 622 may be implemented as a computer having tangible computer-readable media for carrying or having computer-executable instructions or data structures stored thereon.

Controller 620 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 402 in accordance with the embodiments described in the present disclosure.

HNC 621 controls extender 404 within the wireless network. HNC 621 may perform tasks such as steering connected devices, a non-limiting example of which is a cell phone, from one access point to another.

Memory 622 as will be described in greater detail below, has instructions, including onboarding program 623, stored therein to be executed by controller 620 to: transmit the restricted mode instruction to instruct extender 404 to operate in the restricted mode of operation and to instruct extender 404, as shown in FIG. 4B to transmit beacon 408 on an assigned channel; receive a notification of probe request 410; transmit the onboarding instruction to instruct extender 404 to initiate onboarding of extender 406 in response to the notification; and transmit the primary mode instruction to instruct extender 404 to operate in a primary mode of operation.

In some embodiments, memory 622, as will be described in greater detail below, has instructions, including onboarding program 623, stored therein to be executed by controller 620 to transmit the beacon on the assigned channel of one of a plurality of channels or another plurality of channels.

In some embodiments, memory 622, as will be described in greater detail below, has instructions, including onboarding program 623, stored therein to be executed by controller 620 to: start a timer based on the notification of probe request 410; and transmit a network reset instruction the earlier of when extender 406 connects to the wireless network prior to expiration of the timer or upon expiration of the timer.

Radio 624 may include a WLAN interface radio transceiver that is operable to communicate with client device 401, extender 404, and external server 110. Radio 624 includes one or more antennas and communicates wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radio 624 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Interface 626 can include one or more connectors, such as RF connectors, or Ethernet connectors, and/or wireless communication circuitry, such as 5G circuitry and one or more antennas. Interface 626 receives data from external server 110 by known methods, non-limiting examples of which include terrestrial antenna, satellite dish, wired cable, coaxial cable (DOCSIS), DSL, optical fibers, or 5G as discussed above.

As shown in FIG. 6, client device 401 includes: a controller 630; a memory 632, which has stored thereon an onboarding program 633; and at least one radio, a sample of which is illustrated as a radio 634; an interface 636; and a graphic user interface (GUI) 638.

In this example, controller 630, memory 632, radio 634, and interface 636 are illustrated as individual devices. However, in some embodiments, at least two of controller 630, memory 632, radio 634, and interface 636 may be combined as a unitary device. Further, in some embodiments, at least one of controller 630 and memory 632 may be implemented as a computer having tangible computer-readable media for carrying or having computer-executable instructions or data structures stored thereon.

Controller 630 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of gateway device 402 in accordance with the embodiments described in the present disclosure.

Memory 632 as will be described in greater detail below, has instructions, including onboarding program 633, stored therein to be executed by controller 630 to: associate with the wireless network; and transmit an onboard new APD instruction to gateway device 402.

Memory 632 as will be described in greater detail below, has instructions, including onboarding program 633, stored therein to be executed by controller 630 to: transmit the onboarding instruction to cause gateway device 402 to cause extender 404 to initiate onboarding of 406 by implementing the WPS without having a WPS push button to have been pushed.

Radio 634 may include a Wi-Fi WLAN interface radio transceiver that is operable to communicate with gateway device 402, extender 406, and external server 110. Radio 634 includes one or more antennas and communicates wirelessly via one or more of the 2.4 GHz band, the 5 GHz band, the 6 GHz band, and the 6E GHz band, or at the appropriate band and bandwidth to implement any IEEE 802.11 Wi-Fi protocols, such as the Wi-Fi 4, 5, 6, or 6E protocols. Radio 634 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands or 6E GHz bands, RF4CE protocol, ZigBee protocol, Z-Wave protocol, or IEEE 802.15.4 protocol.

Interface 636 can include one or more connectors, such as RF connectors, or Ethernet connectors, and/or wireless communication circuitry, such as 5G circuitry and one or more antennas. Interface 636 receives data from external server 110 by known methods, non-limiting examples of which include terrestrial antenna, satellite dish, wired cable, coaxial cable (DOCSIS), DSL, optical fibers, or 5G as discussed above.

GUI 638 may be any known device or system to display an interactive image to enable a user to interact with client device 401.

In operation, presume that user 102 is operating client device 401, which is configured to communicate with gateway device 402, to onboard extender 406 to the network. Controller 630 will execute instructions stored on memory 632 to cause client device 401 to transmit, via radio 634, onboard new APD instruction 405 to gateway device 402. Onboard new APD instruction 405 will instruct gateway device 402 to restrict the restrict network operation.

In some embodiments, gateway device 402 may restrict the network by instructing all APDs, including itself and any connected extenders, not to operate on a specific channel or group of channels. In some embodiments, gateway device 402 may restrict the network by instructing all APDs, including itself and any connected extenders, to operate only on a specific assigned channel or group of assigned channels. In some embodiments, gateway device 402 may restrict a specific APD not to operate on a specific channel or group of channels. Further, in some embodiments, gateway device 402 may restrict the network by instructing a specific APD to operate only on a specific assigned channel or group of assigned channels.

Returning to FIG. 3, if it is not determined that the client signal is received (N at S308), the network continues to be monitored (Return to S306). For example, there may be cases wherein a user may initially place a new extender sufficiently close to the gateway (or an already onboarded extender), such that the gateway (or the already onboarded extender) may receive a probe request from the new extender. In these situations, the onboarding the new extender can commence and client device 401 will not need to transmit an onboard new APD instruction. In particular, in some embodiments, WPS or similar on-boarding steps may still need to be initiated by user 102 and/or client device 401.

Returning to FIG. 3, if it is determined that the client signal is received (Y at S308), then the network is restricted (S310). This will be described in greater detail with additional reference to FIGS. 5B and 6.

Returning to FIG. 6, at time $t_1$, that radio 624 of gateway device 402 has received onboard new APD instruction 405 from client device 401. Controller 620 will execute instructions stored on memory 622 to cause gateway device 402 to restrict the network. In this example embodiment, gateway device 402 will operate and instruct extender 404 to operate on a specific assigned channel. This will be described in greater detail with reference to FIG. 5B.

Figure 5B:
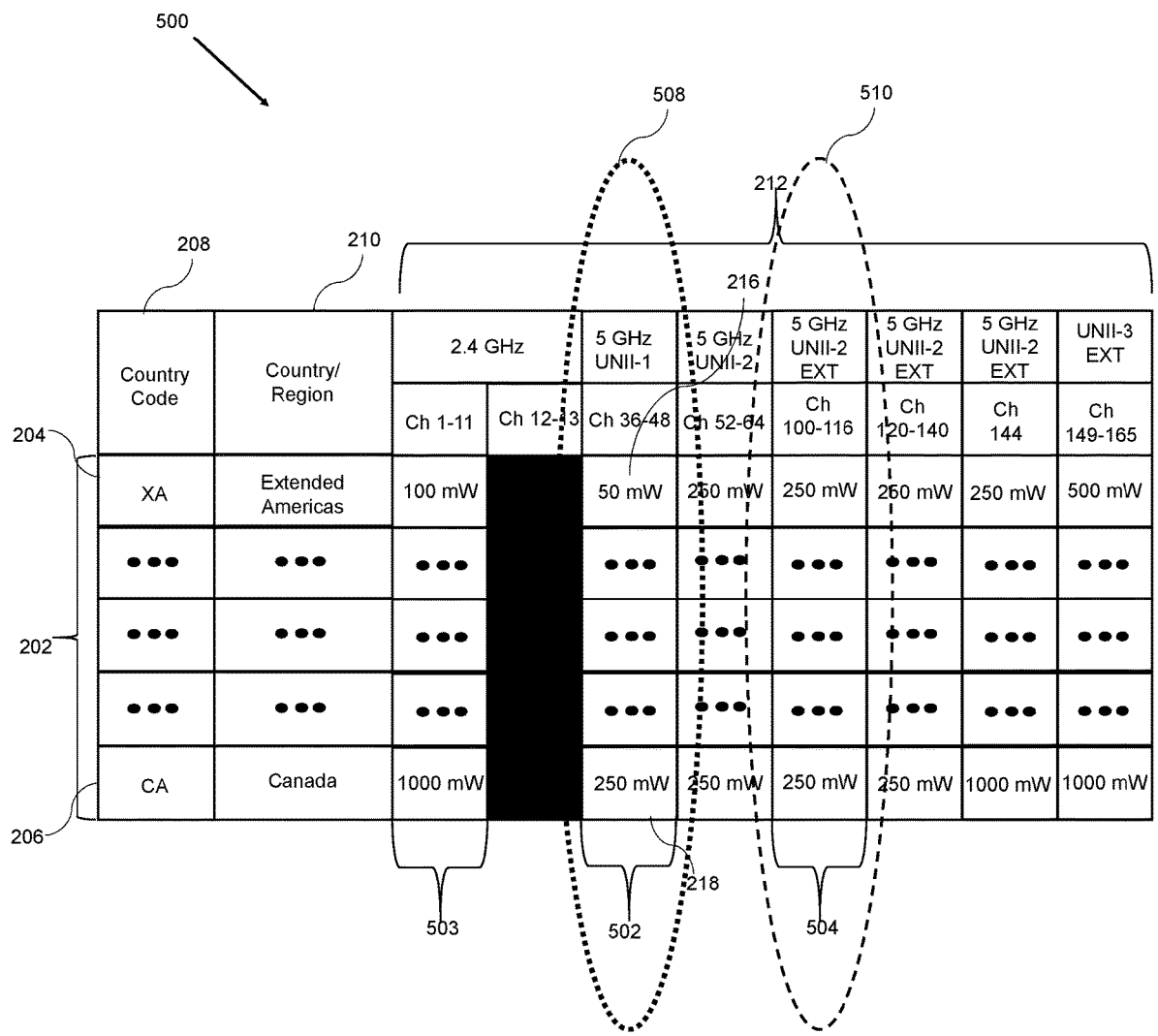
FIG. 5B illustrates an example country code chart at time $t_1$ in accordance with aspects of the present disclosure.

FIG. 5B illustrates an example country code chart 500 at time $t_1$ in accordance with aspects of the present disclosure.

As shown in the figure, the minimum maximum broadcast power for channels in channel column 502 (indicated by dotted ellipse 508) is 50 mW in the Extended Americas region, as indicated by entry 216. If a new extender were to try to onboard, without knowing the country code, the extender would be limited to broadcasting at 50 mW. This would happen even if the new extender were deployed in Canada, which has a maximum broadcast power of 250 mW on the same channels. To avoid this situation, in response to receiving onboard new APD instruction 405, gateway device 402 operates in a restricted mode of operation by restricting the wireless network.

In some embodiments, gateway device 402 operates in a restricted mode of operation by restricting the network by instructing extender 404 not to operate in any of channels 36-48. Further, in some embodiments gateway device 402 operates in a restricted mode of operation by restricting the network by instructing extender 404 not to operate in the entire 2.4 GHz band, which includes channels 1-13, as these are very power limited also. In particular, 100 mW of transmission EIRP can be worse than 50 mW transmission power. EIRP is equal to the transmit power of the radio plus the antenna gain and minus any cable loss between the antenna and transmitter. In any of these ways, extender 406 will not be limited to attempting to onboard with 50 mW of power. This will extend the distance for which extender 406 may be initially placed from extender 404.

In some embodiments, gateway device 402 operates in a restricted mode of operation by restricting the network by instructing extender 404 to operate in a specific assigned channel from a group of channels. For example, gateway device 402 may instruct extender 404 to operate in any channel of the channels in channel column 504, as indicated by dashed ellipse 510. In this way, extender 406 will be able to attempt to onboard with 250 mW of power. This will extend the distance for which extender 406 may be initially placed from extender 404.

In some embodiments, gateway device 402 operates in a restricted mode of operation by restricting the network by instructing extender 404 to only operate in a specific assigned channel from a group of channels. For example, gateway device 402 may instruct extender 404 to operate in channel 108 of the channels in channel column 504, as indicated by dashed ellipse 510. In this way, extender 406 will be able to attempt to onboard with 250 mW of power. This will extend the distance for which extender 406 may be initially placed from extender 404.

In some embodiments, gateway device 402 operates in a restricted mode of operation by restricting the network by instructing extender 404 to not operate in an entire band. For example, gateway device 402 may instruct extender 404 to not operate in the entire 2.4 GHz band, including channels 1-13.

In the event that either of gateway device 402 and/or extender 404 have clients connected, when operating on channel 36. These clients must be steered to new channel 108. This may be performed by any known steering protocol, a non-limiting example of which includes broadcasting a channel change request instructing the associated clients to steer to channel 108. Extender 404 and gateway device 402 would then switch to channel 108. The clients would then re-associate with the respective extender 404 and gateway device 402 in accordance with the channel change request. At this point the network will be operating, in a restricted mode of operation, on channel 108.

Returning to FIG. 3, after the network is restricted (S310), a timer is started (S312). For example, as shown in FIG. 6, controller 600 will execute instructions stored on memory 602 to cause extender 406 to start a timer after restricting the network. A non-limiting example of a time of the timer may be 2 minutes. The purpose of the time is to provide extender 406 sufficient time to complete the onboarding process.

As shown in FIG. 4B, once gateway device 402, client device 401, and extender 404 are operating on channel 108, extender 404 will transmit a new beacon, which in this case is beacon 408.

Returning to FIG. 3, after the timer is started (S312), it is determined whether the new access point has connected (S314). For example, gateway device 402 may determine whether a new extender has successfully onboarded onto the network.

As previously stated, gateway device 402 and all connected devices were operating on channel 36, where the maximum transmission power of onboarding devices is 50 mW in the Extended Americas. Due to such a low transmission power, onboarding devices would need to be very close to the access point they are connecting to. Again, in this example for discussion purposes, gateway device 402 as restricted the network by operating and instructing extender 404 to operate on channel 108. Although not shown in FIG. 5B, let channel 108 have a minimum maximum transmission power of 250 mW. Accordingly, it does not matter where deployed, the maximum transmission power will be 250 mW in the Extended Americas, which is much higher than 50 mW. This will allow onboarding devices to connect to the network much more efficiently, as they will be allowed to operate at 250 mW opposed to 50 mW.

Returning to FIG. 4B, as extender 406 is located within area 118, the operating area of extender 404, extender 406 will receive beacon 408. Extender 406 will in turn transmit probe request 410 to extender 404. With extender 404 operating on channel 108, which as a transmission power of 250 mW, extender 406 now has an operating area of area 124.

After extender 404 receives probe request 410, onboarding is initiated and may be completed by known protocols. When extender 404 completes the onboarding process, it will show up on the host table within HNC 621. Accordingly, returning to FIG. 6, controller 620 of gateway device 402 may determine whether extender 406 has connected to the wireless network if extender 406 shows up on the host table within HNC 621.

Returning to FIG. 3, if it is determined that the new access point device has connected (Y at S314), then the network is de-restricted (S318). This will be described in greater detail with reference to FIG. 4C.

Figure 4C:
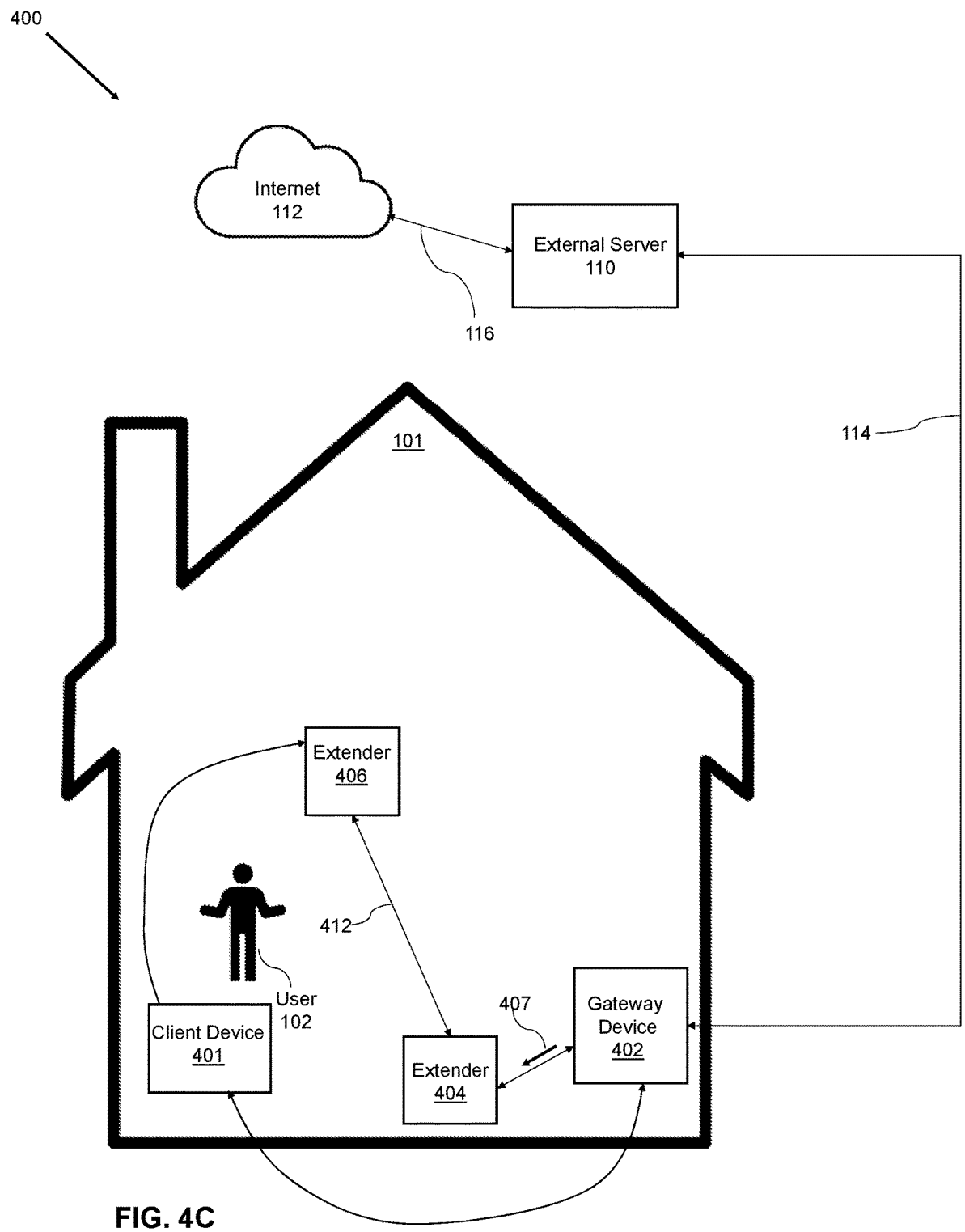
FIG. 4C illustrates a communication system at a time $t_2$ in accordance with aspects of the present disclosure.

FIG. 4C illustrates communication system 400 at a time $t_2$ in accordance with aspects of the present disclosure.

As shown in FIG. 4C, extender 406 is connected to the network as illustrated by and wireless communication channel 412. Once detected by gateway device 402, gateway device 402 transmits a network reset instruction 407 to all onboarded extenders. For example, as shown in FIG. 6, controller 620 executes instructions in onboarding program 623 to instruct radio 624 to transmit the network reset instruction 407 to radio 614 of controller 610 and to radio 604 of extender 406. Network reset instruction 407 instructs extender 406 and extender 404 to operate in a normal mode of operation, as opposed to the restricted mode of operation. Further, gateway device 402 additionally operates in a normal mode of operation.

As such, each of gateway device 402, extender 404 and extender 406 then are unrestricted and able to use any of the channels. In some cases, gateway device 402, extender 404 and extender 406 return to operate on the channel for which gateway device 402 and extender 404 were operating prior the operation in the restricted mode of operation. In other cases, gateway device 402, extender 404 and extender 406 may operate on yet another channel in order to optimize network parameters by known methods.

Returning to FIG. 3, if it is determined that the new access point device has not connected (N at S314), it is then determined if the timer has expired (S316). For example, controller 620 of gateway device 402 will execute instructions stored on memory 622 to cause gateway device 402 to monitor the timer. While the timer is being monitored, gateway device 402 will continue to determine if any devices have onboarded to the network.

Returning to FIG. 3, if it is determined that the timer has not expired (N at S316), then it is once again determined if the new access point has connected (Return to S314). If it is determined that the timer has expired (Y at S316), then the network is de-restricted (S318). For example, presume that the two minute timer has expired and extender 406 has still not connected to the network. Restricted channels 508 will be unrestricted, allowing gateway device 402 and all connected devices to reconnect to any of channels as desired, including 36-48.

Returning to FIG. 3, after the network is de-restricted (S320), method 300 stops (S320).

In some embodiments, the client device will be configured to provide the operating user with a heat map, which provides recommendations for where to place the onboarding extender.

For example, presume that user 102 is operating client device 401 before extender 406 has onboarded. Controller 630 of client device 401 will execute instructions stored on memory 632 to cause client device 401 to display, via GUI 638, a heatmap to user 102 which provides specific location recommendations to place extender 406, given the locations of extender 404 and gateway device 402.

In some embodiments, the gateway device will restrict an entire channel band, opposed to doing a singular set of channels within a band. For example, presume that gateway device 402, residing in Canada, and all connected devices are operating on channel 11, shown in channel column 503. Controller 620 will execute instructions stored on memory 622 to cause gateway device 402 to restrict the 2.4 GHz bandwidth. Rather than only restricting the channel column 503, which contains channels 1-11, gateway device 402 will restrict channel column 503, as well as the other 2.4 GHz channel column, which contains channels 12-13.

In some embodiments, the onboarding extender can be connected to the network by pressing a Wi-Fi Protected Setup (WPS) button. In accordance with aspects of the present disclosure, a user need not additionally press the WPS on the already onboarded APD, e.g., an extender or gateway.

For example, presume that extender 406 is configured to connect to an access point through pressing a WPS button. In accordance with aspects of the present disclosure, a user may use client device 401 to assist in the procedure. In particular, as shown in FIG. 6, controller 630 of client device 401 will execute instructions stored on onboarding program 633 to cause radio 634 of client device 401 to transmit a WPS instruction to gateway device 402. Upon receiving the WPS instruction, controller 620 of gateway device 402 will execute instructions in onboarding program 623 to cause radio 624 to send the WPS instruction to radio 614 of extender 404. Upon receiving the WPS instruction, controller 610 of extender 404 will execute instructions in onboarding program 613 to cause extender 404 to initiate the WPS protocol using a restricted mode of operation, as if the WPS button (not shown) on extender 404 were pushed, without user 102 actually having to push the WPS button additionally on extender 404.

In this manner, user is able to onboard extender 406 using the WPS protocol by only pushing the WPS button on extender 406 and without having to push the WPS button on extender 404.

This WPS onboarding aspect may be expanded for use in a network having multiple extenders, wherein only the extender being employed to operate in the WPS protocol will also operate in a restricted mode of operation. In this way the remaining extenders will not need to operate in the restricted mode of operation. As such, the remaining extenders will not have to steer clients to a new channel, thus disrupting connection to the wireless network. This will be described in greater detail with reference to FIG. 7.

Figure 7:
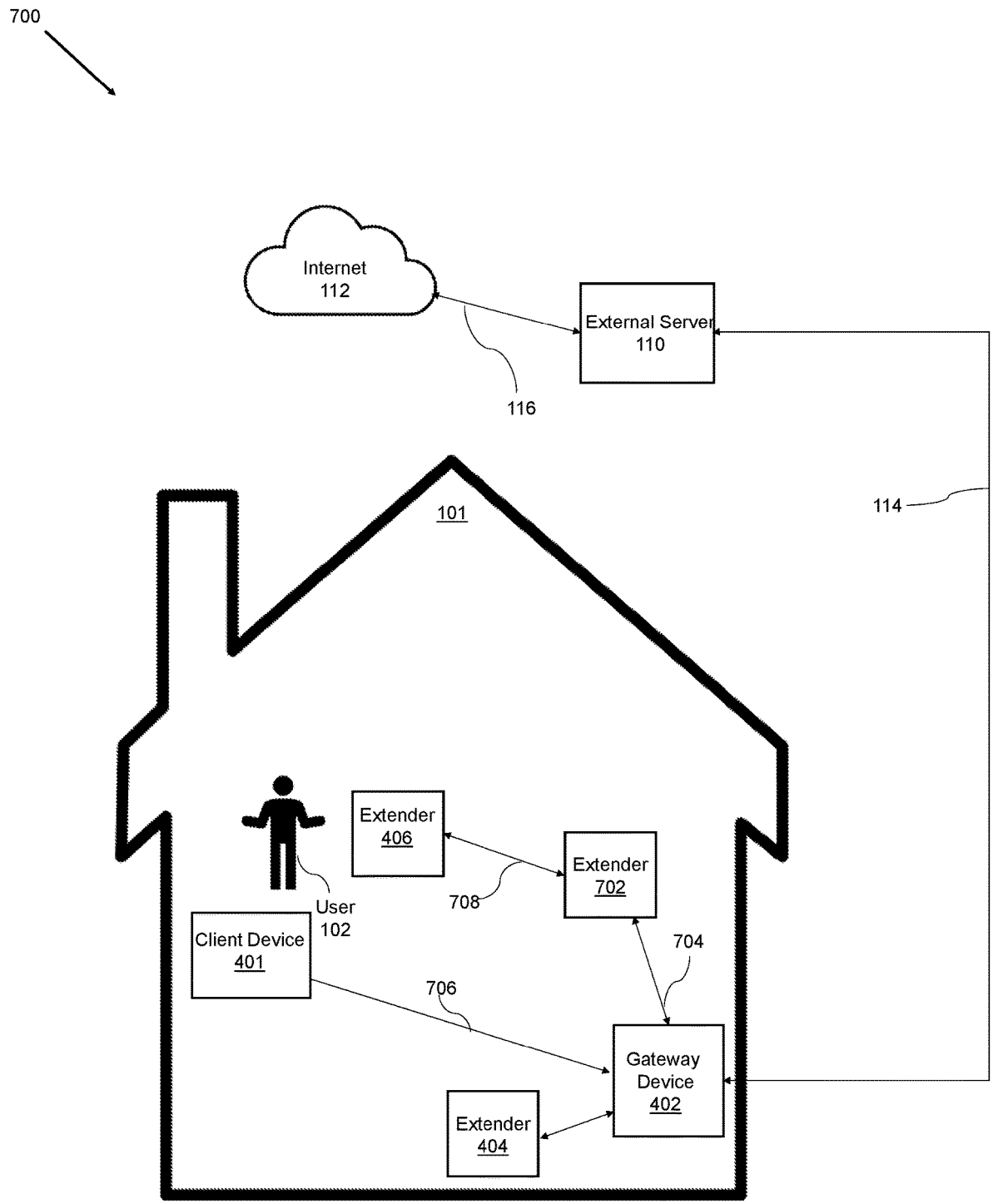
FIG. 7 illustrates a communication system in accordance with aspects of the present disclosure.

FIG. 7 illustrates a communication system 700 in accordance with aspects of the present disclosure.

As shown in FIG. 7, includes communication system 700 includes: residence 101; user 102; client device 401; gateway device 402; an extender 702; extender 406; external server 110; Internet 112; communication channels 114 and 116; and a communication channel 704.

In some embodiments, gateway device 402 may be configured to determine the location of extenders and client devices within the network by known methods, non-limiting examples of which include Wi-Fi triangulation. Accordingly, in operation, gateway device 402 has knowledge of the location of extender 702 and client device 401.

When client device 401 transmits a WPS instruction 706 to instruct gateway device 402 to enable WPS onboarding of extender 406, gateway device 402 may determine that extender 702 is the closest extender to client device 401, and is therefore most likely also the closest extender to extender 406. In accordance with this aspect of the present disclosure, gateway device 402 may therefore only instruct extender 702 to operate in a restricted mode of operation, in addition to instructing extender 702 to perform the WPS onboarding protocol. As such, extender 404 is not switched to a restricted mode of operation.

Further, in some embodiments, gateway device 402 may choose an extender to perform the WPS onboarding protocol based on the signal strength from the new extender's probe request attempt. For example, as shown in FIG. 7, when extender 406 broadcasts a probe request, each of extender 702, extender 404, and maybe even gateway device 402 may receive the probe request. The probe request as received by extender 702 will have a signal strength, for example as indicated by the received signal strength indicator (RSSI). Similarly, the probe request as received by extender 404 with have another signal strength. Finally, if gateway device 402 receives the probe request, the probe request as received by gateway device 402 will additionally have yet another signal strength. For purposes of discussion, let the probe request received by extender 702 have the largest signal strength, let the probe request received by extender 404 have the second largest signal strength, and let the probe request received by gateway device 402 have the least signal strength. In this situation, gateway device 402 may choose extender 702 to perform the WPS onboarding protocol in accordance with aspects of the present disclosure.

It should be noted, that many times all extenders and the gateway operate on a single channel, both for backhaul communications and fronthaul communications. With this in mind, this aspect of the present invention is possible when communication channel 704 between extender 702 and gateway device 402 has no upstream bSTA reliance. This may occur if communication channel 704 is a wired backhaul communication channel, e.g., an Ethernet backhaul. This may additionally occur if extender 702 is equipped with a multiple radios, wherein one radio may be dedicated to communication channel 704 and the other radio may be used for a connected wireless communication channel 708 with extender 406. In these situations, the radio used for a connected wireless communication channel 708 with extender 406 may be temporarily placed in a restricted mode of operation in order to onboard extender 406 in a manner according to algorithm 200.

Many gateways and wireless extenders throughout many areas of the world are not provisioned with their country code. Instead, the devices learn of their country code after they have connected to the network. Prior to learning of their country code, the devices which use Wi-Fi radios as their network backhaul must only operate with restricted Wi-Fi power levels based on their region of deployment. The restricted power levels must be restricted to the least amount of power within the minimum common channel set allowed for any of the countries for its region of deployment. Due to the restricted power, the extender may not be successful in its onboarding at the desired distance. Instead, a user may have to move their extender much closer to another WLAN device to have a successful onboarding, then move it back to the desired location afterwards. This can prove to be frustrating for the user.

In accordance with the present disclosure, a user operating a client device will use the client device to onboard an extender. A gateway device will receive an instruction from the client device, signaling the gateway device to restrict the current channel it is operating on. The gateway device and all connected devices will switch to a channel with a higher transmission power. The onboarding extender will then be able to connect to an access point while it is operating at a higher transmission power without being placed directly next to it.

Thus, the present disclosure as disclosed onboards an extender through the use of a client device by signaling access points to switch to a channel with a higher transmission power, allowing the extender to onboard more efficiently.

The operations disclosed herein may constitute algorithms that can be effected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A client device for use with a wireless network controller device, a connected wireless access point device being connected to a wireless network and a second wireless access point device, the connected wireless access point device being configured to wirelessly communicate on any one of a first plurality of channels within a first frequency set and to wirelessly communicate on any one of a second plurality of channels within a second frequency set, the first frequency set having a first maximum-allowed transmission power, the second frequency having a second maximum-allowed transmission power, the second maximum-allowed transmission power being greater than the first maximum-allowed transmission power, the connected wireless access point device being configured to operate in a primary mode of operation and a restricted mode of operation, the wireless network controller device being configured to transmit a primary mode instruction to instruct the connected wireless access point device to operate in the primary mode of operation, to transmit a restricted mode instruction to instruct the connected wireless access point device to operate in the restricted mode of operation, and to transmit an onboarding instruction to instruct the connected wireless access point device to initiate onboarding of the second wireless access point device, the second wireless access point device being configured to transmit a probe request to join the wireless network, the connected wireless access point device being configured to transmit a beacon on an assigned channel of one of the second plurality of channels when operating in the restricted mode of operation, said client device comprising:

a memory having instructions stored therein; and
a processor configured to execute the instructions stored on said memory to cause said client device to:
associate with the wireless network; and
transmit an onboard new access point device (APD) instruction to the wireless network controller device to cause the wireless network controller device to:
transmit the restricted mode instruction to instruct the connected wireless access point device to operate in the restricted mode of operation and to instruct the connected wireless access point device to transmit the beacon on the assigned channel;
receive a notification of the probe request;
transmit the onboarding instruction to instruct the connected wireless access point device to initiate onboarding of the second wireless access point device in response to the notification; and transmit the primary mode instruction to instruct the connected wireless access point device to operate in the primary mode of operation, wherein the onboarding instruction causes at least one of the following:

the connected wireless access point device to transmit the beacon on the assigned channel; and the connected wireless access point device to not transmit the beacon on any channel other than the assigned channel.

2. The client device of claim 1, for use with the connected wireless access point device being additionally configured to wirelessly communicate on any one of a third plurality of channels within a third frequency set, the third frequency set having a third maximum-allowed transmission power, the third maximum-allowed transmission power being greater than the first maximum-allowed transmission power, the connected wireless access point device being still additionally configured to transmit the beacon on the assigned channel of one of the second plurality of channels or the third plurality of channels, wherein the onboarding instruction causes the connected wireless access point device to transmit the beacon on the assigned channel as one of the second plurality of channels and the third plurality of channels.

3. The client of claim 1 for additional use with a second connected wireless access point device being connected to a wireless network, the second connected wireless access point device being configured to wirelessly communicate on any one of the first plurality of channels within the first frequency set and to wirelessly communicate on any one of the second plurality of channels within the second frequency set, wherein the onboarding instruction causes at least one of the following:

only the connected wireless access point device to transmit the beacon on the assigned channel as an onboarding beacon; and the second connected wireless access point device not to transmit the onboarding beacon on the assigned channel.

4. The client device of claim 3 for use with the connected wireless access point device supporting a Wi-Fi protected setup (WPS) to support onboarding and for use with the second wireless access point device having a WPS push button to support onboarding, and wherein said processor is configured to execute instructions stored on said memory to cause said client device to further:

transmit the onboarding instruction to cause the connected wireless access point device to initiate onboarding of the second wireless access point device by implementing the WPS without having a WPS push button to have been pushed on the connected wireless access point device.

5. The client device of claim 1, wherein said processor is configured to execute instructions stored on said memory to cause said wireless network controller device to further:

start a timer based on the notification of the probe request; and transmit a network reset instruction the earlier of when the second wireless access point device connects to the wireless network prior to expiration of the timer or upon expiration of the timer.

6. A method of operating a client device with a wireless network controller device, a connected wireless access point device being connected to a wireless network and a second wireless access point device, the connected wireless access point device being configured to wirelessly communicate on any one of a first plurality of channels within a first frequency set and to wirelessly communicate on any one of a second plurality of channels within a second frequency set, the first frequency set having a first maximum-allowed transmission power, the second frequency set having a second maximum-allowed transmission power, the second maximum-allowed transmission power being greater than the first maximum-allowed transmission power, the connected wireless access point device being configured to operate in a primary mode of operation and a restricted mode of operation, the wireless network controller device being configured to transmit a primary mode instruction to instruct the connected wireless access point device to operate in the primary mode of operation, to transmit a restricted mode instruction to instruct the connected wireless access point device to operate in the restricted mode of operation, and to transmit an onboarding instruction to instruct the connected wireless access point device to initiate onboarding of the second wireless access point device, the second wireless access point device being configured to transmit a probe request to join the wireless network, the connected wireless access point device being configured to transmit a beacon on an assigned channel of one of the second plurality of channels when operating in the restricted mode of operation, said method comprising:

associating, via a processor configured to execute instructions stored on a memory, with the wireless network; and transmitting, via the processor, onboard new access point device (APD) instruction to the wireless network controller device to cause the wireless network controller device to:

transmit the restricted mode instruction to instruct the connected wireless access point device to operate in the restricted mode of operation and to instruct the connected wireless access point device to transmit the beacon on the assigned channel;

receive a notification of the probe request;

transmit the onboarding instruction to instruct the connected wireless access point device to initiate onboarding of the second wireless access point device in response to the notification; and transmit the primary mode instruction to instruct the connected wireless access point device to operate in the primary mode of operation, wherein the onboarding instruction causes at least one of the following:

the connected wireless access point device to transmit the beacon on the assigned channel; and the connected wireless access point device to not transmit the beacon on any channel other than the assigned channel.

7. The method of claim 6, for additional use with the connected wireless access point device being additionally configured to wirelessly communicate on any one of a third plurality of channels within a third frequency set, the third frequency set having a third maximum-allowed transmission power, the third maximum-allowed transmission power being greater than the first maximum-allowed transmission power, the connected wireless access point device being still additionally configured to transmit the beacon on the assigned channel of one of the second plurality of channels or the third plurality of channels, wherein the onboarding instruction causes the connected wireless access point device to transmit the beacon on the assigned channel as one of the second plurality of channels and the third plurality of channels.

8. The method of claim 6, for additional use with a second connected wireless access point device being connected to a wireless network, the second connected wireless access point device being configured to wirelessly communicate on any one of the first plurality of channels within the first frequency set and to wirelessly communicate on any one of the second plurality of channels within the second frequency set,
   wherein the onboarding instruction causes at least one of the following:
      only the connected wireless access point device to transmit the beacon on the assigned channel as an onboarding beacon; and
      the second connected wireless access point device not to transmit the onboarding beacon on the assigned channel.

9. The method of claim 8, for use with the connected wireless access point device supporting a Wi-Fi protected setup (WPS) to support onboarding and for use with the second wireless access point device having a WPS push button to support onboarding, said method further comprising:
   transmitting, via the processor, the onboarding instruction to cause the connected wireless access point device to initiate onboarding of the second wireless access point device by implementing the WPS without having a WPS push button to have been pushed on the connected wireless access point device.

10. The method of claim 6, further comprising:
   starting, via the processor, a timer based on the notification of the probe request; and
   transmitting, via the processor, a network reset instruction the earlier of when the second wireless access point device connects to the wireless network prior to expiration of the timer or upon expiration of the timer.

11. A non-transitory, computer-readable media having computer-readable instructions stored thereon, the computer-readable instructions being capable of being read by a client device for use with a wireless network controller device, a connected wireless access point device being connected to a wireless network and a second wireless access point device, the connected wireless access point device being configured to wirelessly communicate on any one of a first plurality of channels within a first frequency set and to wirelessly communicate on any one of a second plurality of channels within a second frequency set, the first frequency set having a first maximum-allowed transmission power, the second frequency set having a second maximum-allowed transmission power, the second maximum-allowed transmission power being greater than the first maximum-allowed transmission power, the connected wireless access point device being configured to operate in a primary mode of operation and a restricted mode of operation, the wireless network controller device being configured to transmit a primary mode instruction to instruct the connected wireless access point device to operate in the primary mode of operation, to transmit a restricted mode instruction to instruct the connected wireless access point device to operate in the restricted mode of operation, and to transmit an onboarding instruction to instruct the connected wireless access point device to initiate onboarding of the second wireless access point device, the second wireless access point device being configured to transmit a probe request to join the wireless network, the connected wireless access point device being configured to transmit a beacon on an assigned channel of one of the second plurality of channels when operating in the restricted mode of operation, wherein the computer-readable instructions are capable of instructing the client device to perform the method comprising:
   associating, via a processor configured to execute instructions stored on a memory, with the wireless network; and
   transmitting, via the processor, onboard new access point device (APD) instruction to the wireless network controller device to cause the wireless network controller device to:
      transmit the restricted mode instruction to instruct the connected wireless access point device to operate in the restricted mode of operation and to instruct the connected wireless access point device to transmit the beacon on the assigned channel;
      receive a notification of the probe request;
      transmit the onboarding instruction to instruct the connected wireless access point device to initiate onboarding of the second wireless access point device in response to the notification; and
      transmit the primary mode instruction to instruct the connected wireless access point device to operate in the primary mode of operation, wherein the onboarding instruction causes at least one of the following:
         the connected wireless access point device to transmit the beacon on the assigned channel; and
         the connected wireless access point device to not transmit the beacon on any channel other than the assigned channel.

12. The non-transitory, computer-readable media of claim 11, for additional use with the connected wireless access point device being additionally configured to wirelessly communicate on any one of a third plurality of channels within a third frequency set, the third frequency set having a third maximum-allowed transmission power, the third maximum-allowed transmission power being greater than the first maximum-allowed transmission power, the connected wireless access point device being still additionally configured to transmit the beacon on the assigned channel of one of the second plurality of channels or the third plurality of channels, and wherein the computer-readable instructions are capable of instructing the client device to perform the method,
   wherein the onboarding instruction causes the connected wireless access point device to transmit the beacon on the assigned channel as one of the second plurality of channels and the third plurality of channels.

13. The non-transitory, computer-readable media of claim 11, for additional use with a second connected wireless access point device being connected to a wireless network, the second connected wireless access point device being configured to wirelessly communicate on any one of the first plurality of channels within the first frequency set and to wirelessly communicate on any one of the second plurality of channels within the second frequency set, wherein the computer-readable instructions are capable of instructing the client device to perform the method,
   wherein the onboarding instruction causes at least one of the following:
      only the connected wireless access point device to transmit the beacon on the assigned channel as an onboarding beacon; and the second connected wireless access point device not to transmit the onboarding beacon on the assigned channel.

14. The non-transitory, computer-readable media of claim 13, for use with the connected wireless access point device supporting a Wi-Fi protected setup (WPS) to support onboarding and for use with the second wireless access point device having a WPS push button to support onboarding, and wherein the computer-readable instructions are capable of instructing the client device to perform the method further comprising:
   transmitting, via the processor, the onboarding instruction to cause the connected wireless access point device to initiate onboarding of the second wireless access point device by implementing the WPS without having a WPS push button to have been pushed on the connected wireless access point device.

15. The non-transitory, computer-readable media of claim 11, wherein the computer-readable instructions are capable of instructing the client device to perform the method further comprising:
   starting, via the processor, a timer based on the notification of the probe request; and
   transmitting, via the processor, a network reset instruction the earlier of when the second wireless access point device connects to the wireless network prior to expiration of the timer or upon expiration of the timer.

* * * * *